(12) United States Patent
Kojima

(10) Patent No.: US 8,326,503 B2
(45) Date of Patent: *Dec. 4, 2012

(54) LOCK-UP CLUTCH CONTROL DEVICE

(75) Inventor: Sei Kojima, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 471 days.

This patent is subject to a terminal disclaimer.

(21) Appl. No.: 12/452,463

(22) PCT Filed: Jul. 7, 2008

(86) PCT No.: PCT/JP2008/001806
§ 371 (c)(1),
(2), (4) Date: Dec. 31, 2009

(87) PCT Pub. No.: WO2009/008153
PCT Pub. Date: Jan. 15, 2009

(65) Prior Publication Data
US 2010/0145584 A1     Jun. 10, 2010

(30) Foreign Application Priority Data

Jul. 9, 2007   (JP) .................. 2007-180137

(51) Int. Cl.
*G06F 7/00* (2006.01)
(52) U.S. Cl. ............ 701/68; 701/67; 477/174; 477/176; 477/180
(58) Field of Classification Search .................... 701/51, 701/52, 67, 68; 477/38, 64, 176, 174, 175, 477/180; 192/3.29; 475/165
See application file for complete search history.

(56) References Cited

U.S. PATENT DOCUMENTS

| 5,865,708 A | 2/1999 | Nishio et al. |
| 2002/0175036 A1 | 11/2002 | Takatori et al. |
| 2003/0045400 A1* | 3/2003 | Ito et al. .................. 477/176 |
| 2003/0087717 A1* | 5/2003 | Nishida et al. ............ 475/65 |
| 2005/0217957 A1 | 10/2005 | Imamura et al. |
| 2005/0222738 A1 | 10/2005 | Imamura et al. |

FOREIGN PATENT DOCUMENTS

EP      1 249 645 A2    10/2002
(Continued)

OTHER PUBLICATIONS

Office Action issued in Japanese Patent Application No. 2007-180137 dated Jul. 19, 2011 (with translation).

(Continued)

*Primary Examiner* — Gertrude Arthur Jeanglaude
(74) *Attorney, Agent, or Firm* — Oliff & Berridge, PLC

(57) ABSTRACT

When deceleration lock-up differential pressure learning control is entered and a difference between this deceleration lock-up differential pressure instruction value and a disengagement initial pressure of lock-up smooth off control becomes smaller than prior to deceleration lock-up differential pressure learning control, the disengagement initial pressure PS of lock-up smooth off control is corrected to a low side in accordance with a difference between that deceleration lock-up differential pressure instruction value and the disengagement initial pressure. Furthermore, by changing the sweep gradient of lock-up smooth off control to a small side, and in addition, correcting the disengagement initial pressure PS of lock-up smooth off control to a low side in consideration of disengagement delay of the lock-up clutch pursuant to that sweep gradient change, the actual disengagement time during lock-up smooth off control can be matched with a target disengagement time.

6 Claims, 13 Drawing Sheets

FOREIGN PATENT DOCUMENTS

| | | |
|---|---|---|
| EP | 1 296 085 A2 | 3/2003 |
| JP | A-5-180327 | 7/1993 |
| JP | A-7-27219 | 1/1995 |
| JP | A-9-196158 | 7/1997 |
| JP | A-10-159967 | 6/1998 |
| JP | A-2002-310289 | 10/2002 |
| JP | A-2004-124969 | 4/2004 |
| JP | A-2005-291345 | 10/2005 |

OTHER PUBLICATIONS

International Search Report issued in International Application No. PCT/JP2008/001806; Mailed Oct. 27, 2009.

* cited by examiner (A)

(B)

LOCK-UP CLUTCH CONTROL DEVICE

TECHNICAL FIELD

The present invention relates to a control device of a lock-up clutch directly connecting an input side and an output side of a hydraulic power transmission device disposed between a motive power source such as an engine (internal combustion engine), etc. and an automatic transmission mounted in a vehicle.

BACKGROUND ART

In a vehicle where an engine (internal combustion engine) is mounted, an automatic transmission automatically and optimally setting a gear ratio between the engine and a drive wheel is known as a transmission for suitably transmitting torque and rotation speed generated by the engine to the drive wheel in accordance with a driving condition of the vehicle.

For example, a planetary gear type transmission setting a gear ratio (gear position) using a clutch, a brake, and a planetary gear device, and a belt-type continuously variable transmission (CVT) performing stepless adjustment of a gear ratio exist as an automatic transmission mounted in a vehicle.

A belt-type continuously variable transmission has a belt wound around a primary pulley (input-side pulley) and a secondary pulley (output-side pulley) having a pulley groove (V-groove) and is configured such that a gear ratio is set in a stepless fashion by simultaneously widening a groove width of the pulley groove of one of the pulleys and narrowing a groove width of the pulley grove of the other pulley so as to continuously vary a winding radius (effective diameter) of the belt with respect to each of the pulleys. A torque transmitted in this belt-type continuously variable transmission is a torque corresponding to a load acting in a direction in which the belt and the pulleys are made to contact mutually, and therefore, in order to apply tension to the belt, the belt is clamped by the pulleys.

Furthermore, as explained above, a shift transmission is carried out in a belt-type continuously variable transmission by widening and narrowing the groove widths of the pulley grooves. Specifically, each of the primary pulley and the secondary pulley comprises a fixed sheave and a moveable sheave, and a shift transmission is carried out by moving the moveable sheave forwards and backwards in an axial direction using a hydraulic actuator provided at a rear face side thereof.

In this way, in a belt-type continuously variable transmission, the belt is clamped by the pulleys in order to apply tension to the belt, and in addition, the condition of clamping of the belt by the pulleys is changed in order to carry out a shift transmission. Accordingly, the groove width of the primary pulley and the groove width of the secondary pulley are simultaneously changed by delivering hydraulic pressure corresponding to a required torque as typified by engine load, etc. to the hydraulic actuator at the secondary pulley side so as to secure a necessary transmission torque capacity and by delivering hydraulic pressure for carrying out a shift transmission to the hydraulic actuator at the primary pulley side.

Furthermore, in a vehicle where an automatic transmission is mounted, a fluid-type transmission device such as a fluid coupling or torque converter, etc. is disposed between the engine and the automatic transmission. A fluid-type transmission device provided with a lock-up clutch directly connecting an input side and an output side of the fluid-type transmission device through frictional engagement using an oil pressure of an operating oil exists as a fluid-type transmission device.

Furthermore, in a vehicle where this type of fluid-type transmission device featuring a lock-up clutch is mounted, engagement and disengagement of the lock-up clutch is performed by controlling a hydraulic pressure made to act on the lock-up clutch with, for example, a hydraulic pressure (line pressure) of a hydraulic control system including hydraulic control of an automatic transmission used as an initial pressure (for example, see patent documents 1 and 2). Specifically, in a case of a torque converter featuring a lock-up clutch, control of engagement and disengagement of the lock-up clutch is performed by controlling a differential pressure (lock-up differential pressure) between an engagement-side pressure chamber and a disengagement-side pressure chamber of the torque converter using a lock-up differential-pressure control solenoid valve and a lock-up control valve, etc. and based on a lock-up differential pressure instruction value.

In certain cases in the control of a lock-up clutch, deceleration lock-up control controlling engagement of the lock-up clutch is performed upon deceleration with the accelerator off. With deceleration lock-up control of this type, in order to, for example, prevent stalling of the engine as a result of a reduction in vehicle speed, rapid disengagement of the lock-up clutch is made possible by maintaining engagement at a lowest possible differential pressure (a low-pressure engagement pressure within a range where slipping does not occur) capable of withstanding negative torque such as an auxiliary machinery load and friction of the engine when the accelerator is off (when non-driven), etc.

Furthermore, in control of the lock-up clutch, lock-up smooth off control is executed upon the completion of deceleration lock-up control. Lock-up smooth off control is control for disengaging the lock-up clutch as quickly as possible while suppressing disengagement shock upon deceleration lock-up control completion. In specific terms, it is a control that, at a time whereat there was a completion instruction (lock-up clutch disengagement instruction) of deceleration lock-up control, sets a disengagement initial pressure of lock-up smooth off control based on the vehicle speed, etc., gradually decreases the lock-up differential pressure from that disengagement initial pressure at a prescribed sweep gradient (constant rate of change), and smoothly disengages the lock-up clutch.

It should be noted that, although learning correction of a deceleration lock-up differential pressure (low-pressure engagement pressure) is desirable during deceleration lock-up control, the lock-up clutch needs to be reliably maintained in an engagement condition during deceleration lock-up control, and therefore, execution of feedback control of the deceleration lock-up differential pressure and performing learning correction is difficult.

For this reason, in conventional control, in order that the lock-up clutch does not adopt a slip condition despite disparity in a hydraulic pressure characteristic of the lock-up differential-pressure control solenoid valve controlling the lock-up differential pressure or disparity in hydraulic pressure control due to other individual differences, etc., the deceleration lock-up differential pressure during deceleration lock-up control is set a little larger in consideration of the hydraulic pressure disparity. This point is hereinafter explained with reference to FIG. 9.

First of all, as shown in FIG. 9, in a case where, in contrast to a hydraulic pressure characteristic in a case where hydraulic-pressure control components such as the lock-up differential-pressure control solenoid valve are nominal items (i.e., a hydraulic pressure characteristic as shown by a solid line in the figure), a prescribed disparity (tolerance) as shown by a dashed line in the figure exists, it is necessary to assume lower limit items corresponding to the lowest engagement hydraulic pressure and to set the deceleration lock-up differential pressure a little larger in order to avoid slipping of the lock-up clutch. Specifically, if a map with nominal items as standard as shown by the solid line in FIG. 9 is set as a conversion map for calculating a lock-up differential pressure instruction value PD based on a target value of a lock-up differential pressure PLU, in a case where the hydraulic pressure characteristic corresponds to lower limit items, when the lock-up differential pressure PLU (the target value with nominal items as standard) is [c], the lock-up differential pressure instruction value PD becomes [b]; however, the actual lock-up differential pressure PLU may become a value [a] lower than [c] and the lock-up differential pressure PLU may be insufficient. In conventional control, in order to avoid this, the lock-up differential pressure PLU (the target value with nominal items as standard) is set to a value larger than [a] by a hydraulic pressure disparity correction amount PE.

In a case where the lock-up differential pressure PLU is set a little larger in this way, if the actually-mounted hydraulic-pressure control components such as the lock-up differential-pressure control solenoid valve are nominal items, the actual lock-up differential pressure PLU remains to be hydraulic pressure [c], and if the components are upper limit items, the lock-up differential pressure PLU becomes an even higher hydraulic pressure [d], resulting in control to a higher hydraulic pressure than required. Furthermore, in a case where a conversion map has been set with the hydraulic pressure characteristic of lower limit items as standard, there is no need for the target value of the lock-up differential pressure PLU itself to be made large, but the actual hydraulic pressure becomes larger than required with nominal items and upper limit items.

With the object of eliminating such issues, the applicant of the present invention proposes control appropriately setting the deceleration lock-up hydraulic pressure (low-pressure engagement pressure) during deceleration lock-up control regardless of disparity, etc. of the hydraulic-pressure characteristic of the lock-up clutch.

With this proposed technology, when lock-up smooth off control, gradually disengaging the lock-up clutch upon the completion of deceleration lock-up control, is executed, a disengagement initial pressure of lock-up smooth off control is learned, and the deceleration lock-up differential pressure of deceleration lock-up control is updated to reflect this learning value of the disengagement initial pressure. By executing such deceleration lock-up differential pressure learning control, the deceleration lock-up differential pressure of deceleration lock-up control can be appropriately set in accordance with the hydraulic pressure characteristic, etc. of the actually-mounted lock-up differential-pressure control solenoid valve. That is to say, as the hydraulic pressure characteristic, etc. of the actually-mounted lock-up differential-pressure control solenoid valve is reflected in a disengagement initial pressure learning value of lock-up smooth off control, by updating the deceleration lock-up differential pressure of deceleration lock-up control to reflect that disengagement initial pressure learning value, the deceleration lock-up differential pressure can be appropriately lowered while avoiding a slip condition of the lock-up clutch during deceleration lock-up control.

Furthermore, a learning technology whereby learning is performed until a control differential pressure is reached by gradually changing an initial lock-up differential pressure in a direction of disengagement in accordance with a number of repetitions of deceleration lock-up control has been proposed as a technology for lowering the control hydraulic pressure of deceleration lock-up control (for example, see Patent Citation 1).

Patent Citation 1: JP 2004-124969A
Patent Citation 2: JP H05-180327A
Patent Citation 3: JP H10-159967A
Patent Citation 4: JP H09-196158A
Patent Citation 5: JP H07-027219A

DISCLOSURE OF INVENTION

Technical Problem

It should be noted that, with the above-mentioned proposed technology, there is room for improvement in terms of appropriately executing hydraulic pressure control of lock-up smooth off control. This point is explained hereinafter.

First of all, before implementation of deceleration lock-up differential pressure learning control, as the deceleration lock-up differential pressure (low-pressure engagement pressure) Pdec during deceleration lock-up control is set a little larger in consideration of hydraulic-pressure disparity of hydraulic pressure control components, etc. as explained above, a difference between the deceleration lock-up differential pressure Pdec (lock-up differential pressure instruction value PDB) during deceleration lock-up control and a disengagement initial pressure PLUst (disengagement initial pressure instruction value PSB) of lock-up smooth off control becomes large as shown in FIG. 17. When the difference (PDB−PSB) between the lock-up differential pressure instruction value PDB during deceleration lock-up control and the disengagement initial pressure instruction value PSB of lock-up smooth off control is large in this way, undershoot whereby the actual lock-up differential pressure in lock-up smooth off control becomes lower than the target lock-up differential pressure occurs. With the lock-up smooth off control of the proposed technology, in consideration of such undershoot, a sweep gradient of lock-up smooth off control is set large such that reduction of the actual lock-up differential pressure is maintained while in a condition wherein undershoot occurs, as shown in FIG. 17.

It should be noted that, although a relatively small sweep gradient of lock-up smooth off control is desirable in consideration of shock upon lock-up clutch disengagement, if the sweep gradient of lock-up smooth off control is made small when the difference (PDB−PSB) between the lock-up differential pressure instruction value PDB of deceleration lock-up control and the disengagement initial pressure instruction value PSB of lock-up smooth off control is large prior to entry into deceleration lock-up differential pressure learning control, as shown in FIG. 18, the actual lock-up differential pressure becomes large after the actual lock-up differential pressure has reached the disengagement hydraulic pressure in a disengagement process of the lock-up clutch, and re-engagement of the lock-up clutch becomes a concern.

Meanwhile, as the learning value of the disengagement initial value of lock-up smooth off control is reflected in the deceleration lock-up differential pressure of deceleration lock-up control upon entry into deceleration lock-up differential pressure learning control, as shown in FIG. 17, the lock-up differential pressure instruction value PDA of deceleration lock-up control becomes [PDA=Standard instruction value PDB−Hydraulic pressure disparity correction amount PE"+/−"Lock-up smooth off learning correction amount PL] (see FIG. 12), and a difference between the lock-up differential pressure instruction value PDA and the disengagement initial pressure instruction value PSA during deceleration lock-up differential pressure learning correction becomes smaller. When the lock-up differential pressure instruction value difference (PDA−PSA) becomes smaller in this way, the actual lock-up differential pressure starts to track the target hydraulic pressure during lock-up smooth off control, as shown by a dashed line in FIG. 17, and delay of an actual disengagement time TJKAI with respect to a target disengagement time TMKAI becomes a concern. In consideration of shock upon disengagement of the lock-up clutch, it is desirable that such disengagement delay of the lock-up clutch be made small.

Furthermore, in a condition during deceleration lock-up differential pressure learning control where the difference between the lock-up differential pressure instruction value PDA and the disengagement initial pressure instruction value PSA becomes small and the above-explained undershoot does not occur, shock upon disengagement of the lock-up clutch becomes a concern if lock-up smooth off control is executed using the large sweep gradient of before deceleration lock-up differential pressure learning control unchanged, and improvement is desirable in this regard.

The present invention takes such circumstances into consideration, and it is an object thereof to provide a technology making it possible to execute hydraulic pressure control of lock-up smooth off control more appropriately in a lock-up clutch control device executing deceleration lock-up control performing engagement control of the lock-up clutch and lock-up smooth off control upon deceleration of the vehicle.

Technical Solution

—Problem Solving Principle—

A solving principle of the present invention implemented in order to achieve the above-explained object is, when deceleration lock-up differential pressure learning control is entered and a difference between this deceleration lock-up differential pressure instruction value and the disengagement initial pressure of lock-up smooth off control becomes smaller than prior to deceleration lock-up differential pressure learning control, correction of the disengagement initial pressure of lock-up smooth off control to a low side in accordance with a difference between the deceleration lock-up differential pressure instruction value and the disengagement initial pressure. As a result of such correction, elimination of disengagement delay of the lock-up clutch during lock-up smooth off control becomes possible and shock upon lock-up clutch disengagement can be suppressed. A further solving principle is, upon entry into deceleration lock-up differential pressure learning control, changing of the sweep gradient of lock-up smooth off control to a small side, and in addition, correction of the disengagement initial pressure of lock-up smooth off control to a low side in consideration of disengagement delay of the lock-up clutch pursuant to that sweep gradient change. As a result of such correction, shock upon lock-up clutch disengagement can be suppressed.

—Solving Means—

In specific terms, the present invention proposes a control device of a lock-up clutch applied in a vehicle where a motive power source, an automatic transmission, a hydraulic power transmission device disposed between the motive power source and the automatic transmission, and a lock-up clutch directly connecting an input side and an output side of the hydraulic power transmission device are mounted and executing deceleration lock-up control performing engagement control of the lock-up clutch during vehicle deceleration, lock-up smooth off control gradually disengaging the lock-up clutch upon completion of the deceleration lock-up control, lock-up smooth off initial pressure learning control learning a disengagement initial pressure of the lock-up smooth off control, and a deceleration lock-up differential pressure learning control reflecting a learning value of a disengagement initial pressure of the lock-up smooth off control in a deceleration lock-up differential pressure during the deceleration lock-up control. Furthermore, in such a control device of a lock-up clutch, the disengagement initial pressure of the lock-up smooth off control is corrected in a case where the deceleration lock-up differential pressure learning control is entered. More specifically, it is characterized in that, in a case where deceleration lock-up differential pressure learning control is entered, the disengagement initial pressure of the lock-up smooth off control is corrected to a low side in accordance with a difference between a deceleration lock-up differential pressure instruction value and a disengagement initial pressure of lock-up smooth off control.

As a result of this particular matter, when lock-up smooth off control gradually disengaging the lock-up clutch from a time of completion of deceleration lock-up control is executed, a disengagement initial pressure of lock-up smooth off control is learned, and the deceleration lock-up differential pressure (low-pressure engagement pressure) of deceleration lock-up control is updated to reflect this disengagement initial pressure learning value. By executing such deceleration lock-up differential pressure learning control, the deceleration lock-up differential pressure of deceleration lock-up control can be appropriately set in accordance with the hydraulic pressure characteristic, etc. of the actually-mounted lock-up differential-pressure control solenoid valve. That is to say, as explained hereinafter, as the hydraulic pressure characteristic, etc. of the actually-mounted lock-up differential-pressure control solenoid valve is reflected in a disengagement initial pressure learning value of lock-up smooth off control, by updating the deceleration lock-up differential pressure of deceleration lock-up control to reflect that disengagement initial pressure learning value, the deceleration lock-up differential pressure can be appropriately lowered while avoiding a slip condition of the lock-up clutch during deceleration lock-up control.

Further, in a case where deceleration lock-up differential pressure learning control is entered, the disengagement initial pressure of lock-up smooth off control is corrected based on the deceleration lock-up differential pressure instruction value. Specifically, a disengagement delay of the lock-up clutch is eliminated by correcting the disengagement initial pressure of lock-up smooth off control to a low side in accordance with a difference between the deceleration lock-up differential pressure instruction value and the disengagement initial pressure of lock-up smooth off control. That is to say, when the difference between the deceleration lock-up differential pressure instruction value (lock-up differential pressure instruction value PD) and the disengagement initial pressure of lock-up smooth off control (lock-up differential pressure instruction value PS) becomes small, as shown by a dashed line in FIG. 17, the actual lock-up differential pressure will track the target hydraulic pressure. Accordingly, upon entry into deceleration lock-up learning control, the actual disengagement time of lock-up smooth off control becomes longer, and therefore, as the learning value of the disengagement initial pressure becomes excessively large, correction is applied. As a result of such correction of the learning value of the disengagement initial pressure, the actual disengagement time during lock-up smooth off control can be matched with the target disengagement time, and disengagement delay of the clutch can be eliminated. As a result of this, shock upon disengagement of the lock-up clutch can be suppressed more effectively.

In addition, a further resolution means may be cited as follows. First of all, a configuration changing, in a control device of a lock-up clutch executing deceleration lock-up control performing engagement control of the lock-up clutch during vehicle deceleration, lock-up smooth off control gradually disengaging the lock-up clutch at a sweep gradient upon completion of the deceleration lock-up control, lock-up smooth off initial pressure learning control learning a disengagement initial pressure of the lock-up smooth off control, and deceleration lock-up differential pressure learning control reflecting a learning value of a disengagement initial pressure of the lock-up smooth off control in a deceleration lock-up differential pressure during the deceleration lock-up control, a sweep gradient of the lock-up smooth off control in a case where the deceleration lock-up differential pressure learning control is entered may be cited. More specifically, a configuration that, in a case where deceleration lock-up differential pressure learning control is entered, corrects the sweep gradient of the lock-up smooth off control to a small side and also corrects the disengagement initial pressure of lock-up smooth off control to a low side in accordance with a difference between a deceleration lock-up differential pressure instruction value and the disengagement initial pressure of the lock-up smooth off control may be cited.

As a result of this particular matter, the above-described deceleration lock-up differential pressure learning control can be executed, and as a result of this, the deceleration lock-up differential pressure can be appropriately lowered while avoiding a slip condition of the lock-up clutch during deceleration lock-up control. Further, when deceleration lock-up differential pressure learning control is entered, the sweep gradient of lock-up smooth off control is changed based on the deceleration lock-up differential pressure instruction value thereof. In specific terms, in a case where deceleration lock-up differential pressure learning control is entered, shock upon lock-up clutch disengagement can be suppressed by correcting the sweep gradient of lock-up smooth off control to a smaller side than before deceleration lock-up differential pressure learning control in accordance with a difference between a deceleration lock-up differential pressure instruction value and a disengagement initial pressure of lock-up smooth off control. Furthermore, although the actual disengagement time becoming longer than the target disengagement time in a case where the sweep gradient of lock-up smooth off control has been made smaller becomes a concern, the actual disengagement time can be matched to the target disengagement time by correcting the disengagement initial pressure of lock-up smooth off control to a small side in accordance with the amount by which the sweep gradient has been made smaller.

Furthermore, as another solving means, a configuration providing, in a control device of a lock-up clutch executing deceleration lock-up control performing engagement control of the lock-up clutch during vehicle deceleration, lock-up smooth off control gradually disengaging the lock-up clutch at a sweep gradient upon completion of the deceleration lock-up control, lock-up smooth off initial pressure learning control learning a disengagement initial pressure of the lock-up smooth off control, and deceleration lock-up differential pressure learning control reflecting a learning value of a disengagement initial pressure of the lock-up smooth off control in a deceleration lock-up differential pressure during the deceleration lock-up control, a first correction means for correcting the disengagement initial pressure of the lock-up smooth off control upon entry into the deceleration lock-up differential pressure learning control and a second correction means for changing the sweep gradient of the lock-up smooth off control upon entry into the deceleration lock-up differential pressure learning control may be cited. More specifically, a configuration that, in a case where deceleration lock-up differential pressure learning control is entered, corrects the disengagement initial pressure of the lock-up smooth off control to a low side in accordance with a difference between a deceleration lock-up differential pressure instruction value and the disengagement initial pressure of the lock-up smooth off control, and in addition, corrects the sweep gradient of lock-up smooth off control to a small side and also corrects the disengagement initial pressure of the lock-up smooth off control to a low side in accordance with a difference between a deceleration lock-up differential pressure instruction value and the disengagement initial pressure of the lock-up smooth off control may be cited.

As a result of this particular matter, the above-described deceleration lock-up differential pressure learning control can be executed, and as a result of this, the deceleration lock-up differential pressure can be appropriately lowered while avoiding a slip condition of the lock-up clutch during deceleration lock-up control. Furthermore, as a result of the above-described correction of the learning value of the disengagement initial pressure and changing of the sweep gradient, disengagement delay of the lock-up clutch after entry into deceleration lock-up differential pressure learning control can be eliminated and shock upon disengagement of the lock-up clutch can be suppressed more effectively.

Advantageous Effects

In accordance with the present invention, it becomes possible to execute hydraulic pressure control of lock-up smooth off control more appropriately in a lock-up clutch control device executing deceleration lock-up control performing engagement control of the lock-up clutch and lock-up smooth off control upon deceleration of the vehicle.

EXPLANATION OF REFERENCE

Figure 1:
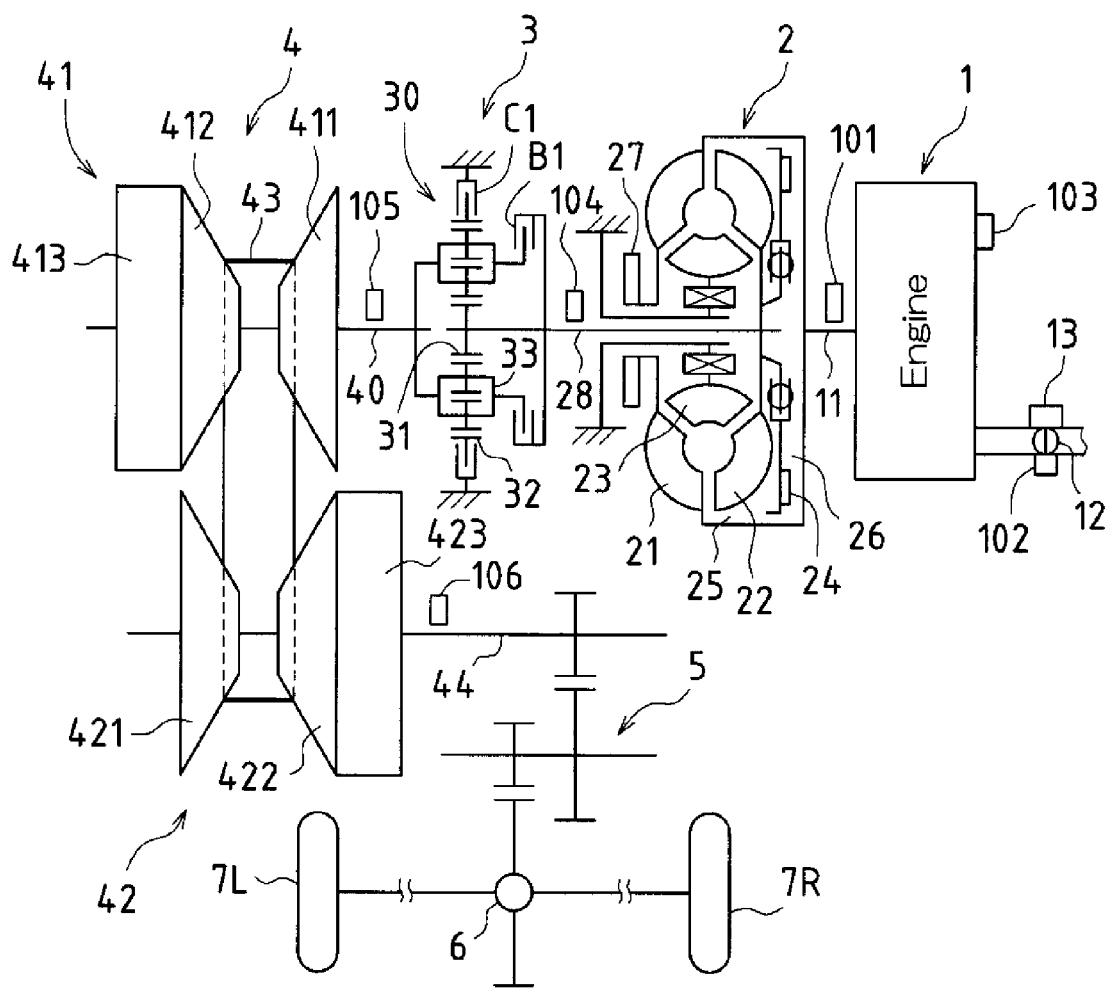
FIG. 1 is a schematic configuration diagram of a vehicle to which the present invention is applied.

1: Engine (motive power source)
2: Torque converter (hydraulic power transmission device)
20: Hydraulic pressure control circuit
24: Lock-up clutch
25: Engagement-side oil chamber
26: Disengagement-side oil chamber
4: Belt-type continuously variable transmission (automatic transmission)
8: ECU
101: Engine rotation speed sensor
102: Throttle-opening degree sensor
109: Brake pedal sensor
104: Turbine rotation speed sensor
106: Vehicle speed sensor
107: Accelerator opening-degree sensor
200: Lock-up control circuit
201: Lock-up control valve
DSU: Lock-up differential-pressure control solenoid valve

BEST MODE FOR CARRYING OUT THE INVENTION

The following is a description of embodiments of the present invention, with reference to the drawings.

FIG. 1 is a schematic configuration diagram of a vehicle to which the present invention is applied.

The vehicle of this example is an FF (front-engine, front-drive) type vehicle where an engine (internal combustion engine) 1 constituting a source of motive power for driving, a torque converter 2 as a hydraulic power transmission device, a forward-reverse switching device 3, a belt-type continuously variable transmission (CVT) 4, a deceleration gear device 5, a differential gear device 6, and an ECU (Electronic Control Unit) 8 (see FIG. 3) etc., are mounted, and a lock-up control device is realized, for example, by that ECU 8 and a lock-up control circuit 200 (hydraulic pressure control circuit 20) described hereinafter.

A crankshaft 11 constituting an output shaft of the engine 1 is connected to the torque converter 2, and an output of the engine 1 is transmitted from the torque converter 2 to the differential gear device 6 via the forward-reverse switching device 3, the belt-type continuously variable transmission 4, and the deceleration gear device 5 and is delivered to left and right drive wheels 7L, 7R.

Various sections of the engine 1, the torque converter 2, the forward-reverse switching device 3, the belt-type continuously variable transmission 4, and the ECU 8 are described hereinafter.

—Engine—

The engine 1 is, for example, a multiple cylinder gasoline engine. A volume of intake air drawn into the engine 1 is adjusted by an electronic-control type throttle valve 12. The throttle valve 12 is capable of electronically controlling a degree of throttle opening independent of an accelerator-pedal operation of a driver, and that degree of opening (throttle-opening degree) is detected by a throttle-opening degree sensor 102. Furthermore, a temperature of a coolant of the engine 1 is detected by a coolant temperature sensor 103.

The throttle-opening degree of the throttle valve 12 is drive controlled by the ECU 8. In specific terms, the throttle-opening degree of the throttle valve 12 is controlled so as to acquire the optimum intake air volume (target air-intake volume) in accordance with an engine rotation speed NE detected by an engine rotation speed sensor 101, a degree of accelerator-pedal depression of the driver (accelerator operation amount Acc), and other operation conditions of the engine 1. In more specific terms, the actual throttle-opening degree of the throttle valve 12 is detected using the throttle-opening degree sensor 102, and a throttle motor 13 of the throttle valve 12 is feedback controlled in such a way that that actual throttle-opening degree matches the throttle-opening degree (target throttle-opening degree) at which the above-mentioned target air-intake volume is acquired.

—Torque Converter—

The torque converter 2 is provided with an input-side pump impeller 21, an output-side turbine runner 22, and a stator 23 manifesting torque amplification functionality, etc., and performs transmission of motive power between the pump impeller 21 and the turbine runner 22 via a fluid. The pump impeller 21 is connected to the crankshaft 11 of the engine 1. The turbine runner 22 is connected to the forward-reverse switching device 3 via a turbine shaft 28.

The torque converter 2 is provided with a lock-up clutch 24 directly connecting the input side and the output side thereof. The lock-up clutch 24 can be fully engaged, semi-engaged (engagement in a slip condition), or disengaged by controlling a differential pressure between a hydraulic pressure within an engagement-side oil chamber 25 and a hydraulic pressure within a disengagement-side oil chamber 26 (lock-up differential pressure=hydraulic pressure PON within engagement-side oil chamber 25−hydraulic pressure POFF within disengagement-side oil chamber 26).

The pump impeller 21 and the turbine runner 22 rotate as one as a result of the lock-up clutch 24 being set to the fully engaged condition. Furthermore, as a result of the lock-up clutch 24 being engaged in a prescribed slip condition (semi-engaged condition), the turbine runner 22 rotates behind the pump impeller 21 with a prescribed amount of slip during driving. Meanwhile, the lock-up clutch 24 is set to a disengaged condition by making the lock-up differential pressure negative. It should be noted that the torque converter 2 is provided with a mechanical-type oil pump (hydraulic pressure source) 27 driven through connection with the pump impeller 21.

—Forward-Reverse Switching Device—

The forward-reverse switching device 3 is provided with a double-pinion type planetary gear mechanism 30, a forward-travel clutch (input clutch) C1, and a reverse-travel brake B1.

A sun gear 31 of the planetary gear mechanism 30 is connected as one with the turbine shaft 28 of the torque converter 2, and a carrier 33 is connected as one with an input shaft 40 of the belt-type continuously variable transmission 4. Furthermore, this carrier 33 and sun gear 31 are selectively connected via the forward-travel clutch C1, and a ring gear 32 is configured so as to be selectively fixed to a housing via the reverse-travel brake B1.

The forward-travel clutch C1 and the reverse-travel brake B1 comprise hydraulic-type friction engagement elements engaged and disengaged by a hydraulic pressure control circuit 20 described hereinafter; as a result of the forward-travel clutch C1 being engaged and the reverse-travel brake B1 being disengaged, the forward-reverse switching device 3 adopts a rotation in unison condition and a forward-travel drive transmission channel is established (achieved); and in this condition, drive force in a forward-travel direction is transmitted to a side of the belt-type continuously variable transmission 4.

Meanwhile, as a result of the reverse-travel brake B1 being engaged and the forward-travel clutch C1 being disengaged, a reverse-travel drive transmission channel is established (achieved) by the forward-reverse switching device 3. In this condition, the input shaft 40 rotates in an opposite direction to the turbine shaft 28, and this drive force in a reverse-travel direction is transmitted to the side of the belt-type continuously variable transmission 4. Furthermore, when the forward-travel clutch C1 and the reverse-travel brake B1 are both disengaged, the forward-reverse switching device 3 becomes a neutral (cutoff condition) cutting off transmission of motive force.

—Belt-Type Continuously Variable Transmission—

The belt-type continuously variable transmission 4 comprises an input-side primary pulley 41, an output-side secondary pulley 42, and a metal belt 43 wound around the primary pulley 41 and the secondary pulley 42, etc.

The primary pulley 41 is a variable pulley having a variable effective diameter and comprising a fixed sheave 411 fixed to the input shaft 40 and a moveable sheave 412 provided in a condition so as to be capable of sliding only in an axial direction of the input shaft 40. Similarly, the secondary pulley 42 is also a variable pulley having a variable effective diameter and comprising a fixed sheave 421 fixed to an output shaft 44 and a moveable sheave 422 provided in a condition so as to be capable of sliding only in an axial direction of the output shaft 44.

A hydraulic actuator 413 is disposed at the moveable sheave 412 side of the primary pulley 41 in order to change a V-groove width between the fixed sheave 411 and the moveable sheave 412. Furthermore, a hydraulic actuator 423 is similarly disposed also at the moveable sheave 422 side of the secondary pulley 42 in order to change a V-groove width between the fixed sheave 421 and the moveable sheave 422.

As a result of controlling a hydraulic pressure of the hydraulic actuator 413 of the primary pulley 41 in the belt-type continuously variable transmission 4 of the above-described configuration, the V-groove widths of each of the primary pulley 41 and the secondary pulley 42 vary, a winding diameter (effective diameter) of the belt 43 changes, and the gear ratio "gamma" (gear ratio "gamma"=input-shaft rotation speed Nin/output-shaft rotation speed Nout) continuously changes. Furthermore, the hydraulic pressure of the hydraulic actuator 423 of the secondary pulley 42 is controlled such that the belt 43 is clamped with a prescribed clamping pressure whereat belt slipping does not occur. These controls are executed by the ECU 8 and the hydraulic pressure control circuit 20 (see FIG. 3).

The hydraulic pressure control circuit 20 is provided with a linear solenoid valve and an on-off solenoid valve, etc., and by controlling excitation and non-excitation of those solenoid valves and switching a hydraulic channel, speed-change control of the belt-type continuously variable transmission 4 and engagement-disengagement control of the lock-up clutch 24, etc. can be carried out. Excitation and non-excitation of the linear solenoid valve and the on-off solenoid valve of the hydraulic pressure control circuit 20 are controlled using a solenoid control signal (instruction hydraulic-pressure signal) from the ECU 8.

—Lock-Up Control Circuit—

Next, an example of the lock-up control circuit 200 of the hydraulic pressure control circuit 20 controlling engagement and disengagement of the lock-up clutch 24 is explained by reference to FIG. 2.

The lock-up control circuit 200 of this example is provided with a lock-up control valve 201, a second pressure adjustment valve 220, a lock-up differential-pressure control solenoid valve DSU, and a lock-up solenoid valve SL, etc.

The lock-up control valve 201 is provided with a first line pressure port 202 and a second line pressure port 203 as a pair, and furthermore, is provided with an engagement-side port 204, a disengagement-side port 205, and a signal pressure port 206. An initial pressure PL2 is provided to the first line pressure port 202 and the second line pressure port 203 from the second pressure adjustment valve 220. The second pressure adjustment valve 220 adjusts a control pressure (line pressure) within the hydraulic pressure control circuit 20 (see FIG. 3) and provides the control pressure to the lock-up control valve 201.

The engagement-side port 204 and the disengagement-side port 205 of the lock-up control valve 201 are connected to the engagement-side oil chamber 25 and the disengagement-side oil chamber 26 of the torque converter 2, respectively. Furthermore, the lock-up control valve 201 comprises a feedback chamber 210 provided with a lock-up differential pressure PLU.

The lock-up differential-pressure control solenoid valve DSU is a linear solenoid valve outputting a control signal pressure PDSU when in excitation state and stopping output of the control signal pressure PDSU when in a non-excitation state. Duty control of the excitation current of the lock-up differential-pressure control solenoid valve DSU is performed in accordance with the lock-up differential pressure instruction value PD (including PS described later) output from the ECU 8, and the control signal pressure PDSU is continuously varied. The control signal pressure PDSU output from the lock-up differential-pressure control solenoid valve DSU is provided to the signal pressure port 206 of the lock-up control valve 201.

Figure 2:
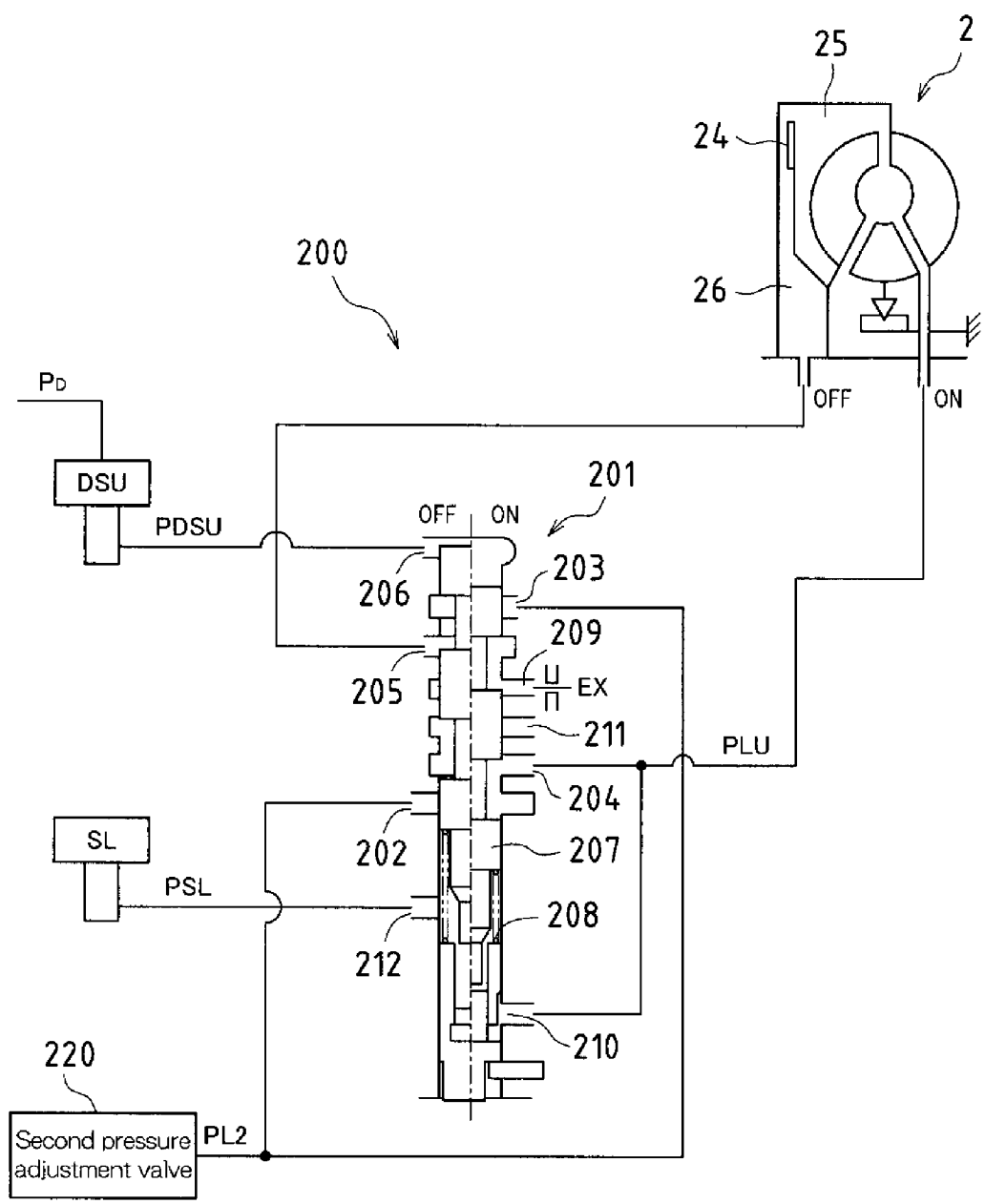
FIG. 2 is a circuit configuration diagram of a lock-up control circuit performing engagement and disengagement control of a lock-up clutch.

In the above-described lock-up control circuit 200, the lock-up differential-pressure control solenoid valve DSU adopts an excitation state in accordance with the lock-up differential pressure instruction value PD output from the ECU 8, and when the resultant control signal pressure PDSU thereof is provided to the signal pressure port 206 of the lock-up control valve 201, as shown in a half on the right side of a centerline in FIG. 2, a spool 207 of the lock-up control valve 201 adopts a condition (ON condition) of having moved in a downward direction against an urging force of a compression coil spring 208 and the first line pressure port 202 and the engagement-side port 204 communicate. As a result of this, the lock-up differential pressure PLU is provided to the engagement-side oil chamber 25 and the disengagement-side port 205 communicates with a drain hole 209, and therefore, an operating oil inside the disengagement-side oil chamber 26 is drained and the lock-up clutch 24 engages (ON).

Furthermore, as the lock-up differential pressure PLU is provided to the feedback chamber 210 of the lock-up control valve 201, the spool 207 moves such that that lock-up differential pressure PLU is balanced with the control signal pressure PDSU. As a result of this, continuous control of the lock-up differential pressure PLU between the hydraulic pressure POFF inside the disengagement-side oil chamber 26 and the hydraulic pressure PON inside the engagement-side oil chamber 25 of the lock-up clutch 24 in accordance with the control signal pressure PDSU, or in other words, the lock-up differential pressure instruction value PD becomes possible, and continuous variation of an engagement force of the lock-up clutch 24 in accordance with that lock-up differential pressure PLU becomes possible.

Meanwhile, when the lock-up differential-pressure control solenoid valve DSU adopts a state of non-excitation and output of the control signal pressure PDSU from the lock-up differential-pressure control solenoid valve DSU stops, the lock-up control valve 201 adopts a condition (OFF condition) wherein, as shown in a half on the left side of the centerline in FIG. 2, the spool 207 has moved in an upward direction to an original position due to the urging force of the compression coil spring 208.

In this OFF condition, the second line pressure port 203 and the disengagement-side port 205 communicate, the initial pressure PL2 is provided to the disengagement-side oil chamber 26 of the lock-up clutch 24, and in addition, the engagement-side port 204 communicates with a discharge port 211. As a result of this, the operating oil inside the engagement-side oil chamber 25 of the lock-up clutch 24 is discharged from the discharge port 211, and the lock-up clutch 24 adopts a disengaged (OFF) condition. The operating oil discharged from the discharge port 211 can, although not shown in the figure, return to an oil pan, etc. via an oil cooler, and the operating oil can be cooled by that oil cooler. It should be noted that excess operating oil is returned to the oil pan, etc. from a cooler bypass valve.

Here, the lock-up control valve 201 is provided with a back-up port 212. An output hydraulic pressure PSL of the lock-up solenoid valve SL is provided to this back-up port 212. When the hydraulic pressure PSL from the lock-up solenoid valve SL is provided to the back-up port 212, the lock-up control valve 201 is, regardless of provision of the control signal pressure PDSU to the signal pressure port 206 of the lock-up control valve 201, maintained in the OFF condition and the lock-up clutch 24 is forcibly disengaged.

The lock-up solenoid valve SL is an on-off solenoid valve, and by outputting the hydraulic pressure PSL at, for example, times of low vehicle speed such as when moving off or stopping, etc., engagement of the lock-up clutch 24 and engine stalling as a result of ON fail, etc. of the lock-up differential-pressure control solenoid valve DSU can be prevented.

—ECU—

Figure 3:
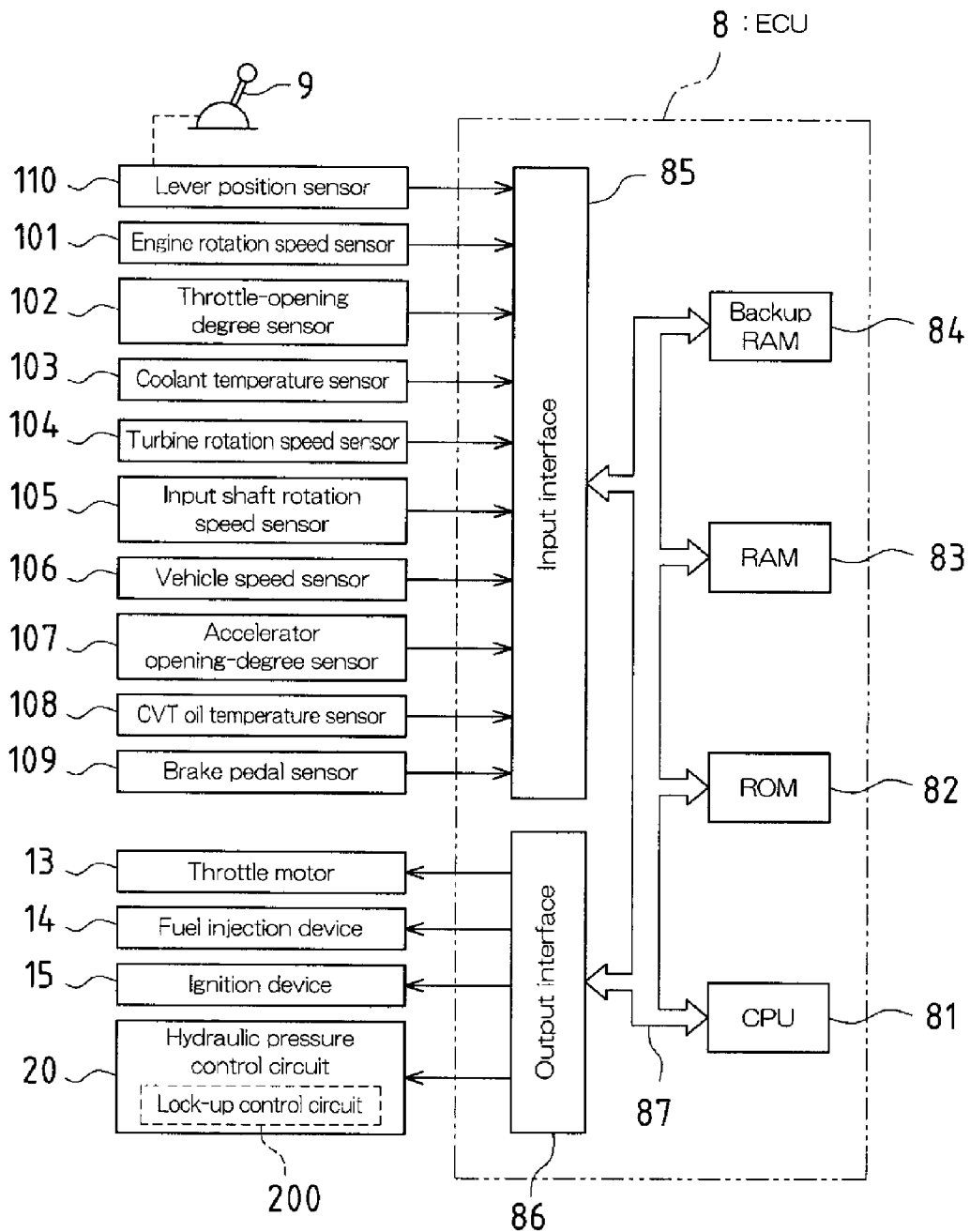
FIG. 3 is a block diagram showing a configuration of a control system of an ECU, etc.

The ECU 8 is, as shown in FIG. 3, provided with, for example, a CPU 81, a ROM 82, a RAM 83, and a back-up RAM 84.

Various types of control program and maps, etc. referenced upon execution of those various types of control program are recorded in the ROM 82. The CPU 81 performs arithmetic processing based on the various types of control program and maps recorded in the ROM 82. Furthermore, the RAM 83 has memory for temporarily recording results of arithmetic operations in the CPU 81 and data input from sensors, etc., and the back-up RAM 84 has non-volatile memory for recording data of the engine 1 to be stored upon stopping thereof, etc.

This CPU 81, the ROM 82, the RAM 83, and the back-up RAM 84 are mutually connected via a bus 87, and in addition, are connected to an input interface 85 and an output interface 86.

The engine rotation speed sensor 101, the throttle-opening degree sensor 102, the coolant temperature sensor 103, a turbine rotation speed sensor 104, an input shaft rotation speed sensor 105, a vehicle speed sensor 106, an accelerator opening-degree sensor 107, a CVT oil temperature sensor 108, a brake pedal sensor 109, and a lever position sensor 110 detecting a lever position (operating position) of a shift lever 9, etc. are connected to the input interface 85 of the ECU 8, and the output signals of the sensors, in other words, signals indicating a rotation speed (engine rotation speed) NE of the engine 1, a throttle-opening degree "theta"th of the throttle valve 12, a coolant water temperature Tw of the engine 1, a rotation speed (turbine rotation speed) NT of the turbine shaft 28, a rotation speed (input shaft rotation speed) Nin of the input shaft 40, a vehicle speed V, an operation amount (accelerator opening degree) Acc of an accelerator operation member such as the accelerator pedal, etc., an oil temperature of the hydraulic pressure control circuit 20 (CVT oil temperature Thc), an existence or non-existence (brake ON/OFF) of an operation of a foot brake constituting a normal-use brake, and a lever position (operation position) of the shift lever 9, etc. are provided to the ECU 8. The throttle motor 13, a fuel injection device 14, an ignition device 15, and the hydraulic pressure control circuit 20 (lock-up control circuit 200), etc. are connected to the output interface 86.

Here, of the signals provided to the ECU 8, the turbine rotation speed NT matches the input shaft rotation speed Nin during forward travel with the forward-travel clutch C1 of the forward-reverse switching device 3 engaged, and the vehicle speed V corresponds to the rotation speed (output shaft speed) Nout of the output shaft 44 of the belt-type continuously variable transmission 4. Furthermore, the accelerator operation amount Acc indicates an output requirement amount of the driver.

Furthermore, the shift lever 9 is configured so as to be capable of being selectively operated to positions such as a parking position "P" for parking, a reverse position "R" for reverse travel, a neutral position "N" cutting off the transmission of motive force, a drive position "D" for forward travel, and a manual position "M" at which the gear ratio "gamma" of the belt-type continuously variable transmission 4 can be increased or decreased by a manual operation during forward driving, etc.

The manual position "M" is provided with a down-shift position and an up-shift position for increasing and decreasing the gear ratio "gamma" or a plurality of range positions, etc. allowing selection of a plurality of speed-change ranges with a different speed-change range upper limit (side at which the gear ratio "gamma" is small).

The lever position sensor 110 comprises a plurality of ON-OFF switches, etc. detecting operation of the shift lever 9 to, for example, the parking position "P", the reverse position "R", the neutral position "N", the drive position "D", and the manual position "M", the up-shift position, the down-shift position, or a range position, etc. It should be noted that, in order to change the gear ratio "gamma" by a manual operation, a down-shift switch, an up-shift switch, or a lever, etc. can be provided independently of the shift lever 9 on a steering wheel, etc.

Further, based on output signals, etc. from the above-described various sensors, the ECU 8 executes output control of the engine 1, speed-change control of the belt-type continuously variable transmission 4, belt clamping force control, and control of engagement and disengagement of the lock-up clutch 24. Further, the ECU 8 executes, for example, deceleration lock-up control, lock-up smooth off control, learning control of disengagement initial pressure of lock-up smooth off control, deceleration lock-up differential pressure learning control, and learning value correction control of disengagement initial pressure of lock-up smooth off control, which will be described later.

Output control of the engine 1 is performed by the throttle motor 13, the fuel injection device 14, the ignition device 15, and the ECU 8, etc. and speed-change control of the belt-type continuously variable transmission 4, belt clamping force control, and control of engagement and disengagement of the lock-up clutch 24 are all carried performed by the hydraulic pressure control circuit 20 (lock-up control circuit 200). This throttle motor 13, the fuel injection device 14, the ignition device 15, and the hydraulic pressure control circuit 20 are controlled by the ECU 8.

Figure 4:
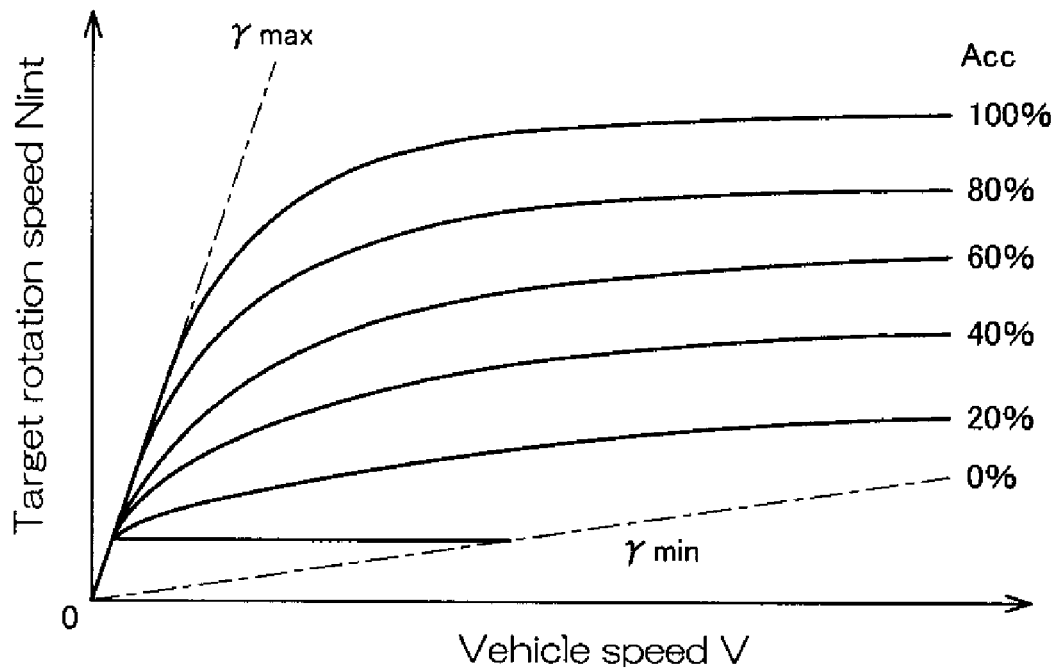
FIG. 4 is a view showing an example of a speed-change map used in speed-change control of a belt-type continuously variable transmission.

In speed-change control of the belt-type continuously variable transmission 4, for example, as shown in FIG. 4, a target rotation speed Nint for an input side is calculated from a speed-change map set in advance with the accelerator operation amount Acc, indicating the output requirement amount of the driver, and the vehicle speed V as parameters, and in order that the actual input-shaft rotation speed Nin matches the target rotation speed Nint, speed-change control of the belt-type continuously variable transmission 4 is performed in accordance with a deviation thereof, that is to say, a speed-change control pressure Pbelt is controlled by provision and discharge of operating oil with respect to the hydraulic actuator 413 of the primary pulley 41, and the gear ratio "gamma" is continuously varied.

The map of FIG. 4 corresponds to speed-change conditions and is configured to set the target rotation speed Nint such that the smaller the vehicle speed V and the larger the accelerator operation amount Acc, the larger the gear ratio "gamma" becomes. Furthermore, as the vehicle speed V corresponds to the output-shaft rotation speed Nout, the target rotation speed Nint, constituting a target value for the input-shaft rotation speed Nin, corresponds to the target gear ratio and is set within a range of the minimum gear ratio "gamma"min and the maximum gear ratio "gamma"max of the belt-type continuously variable transmission 4.

Figure 5:
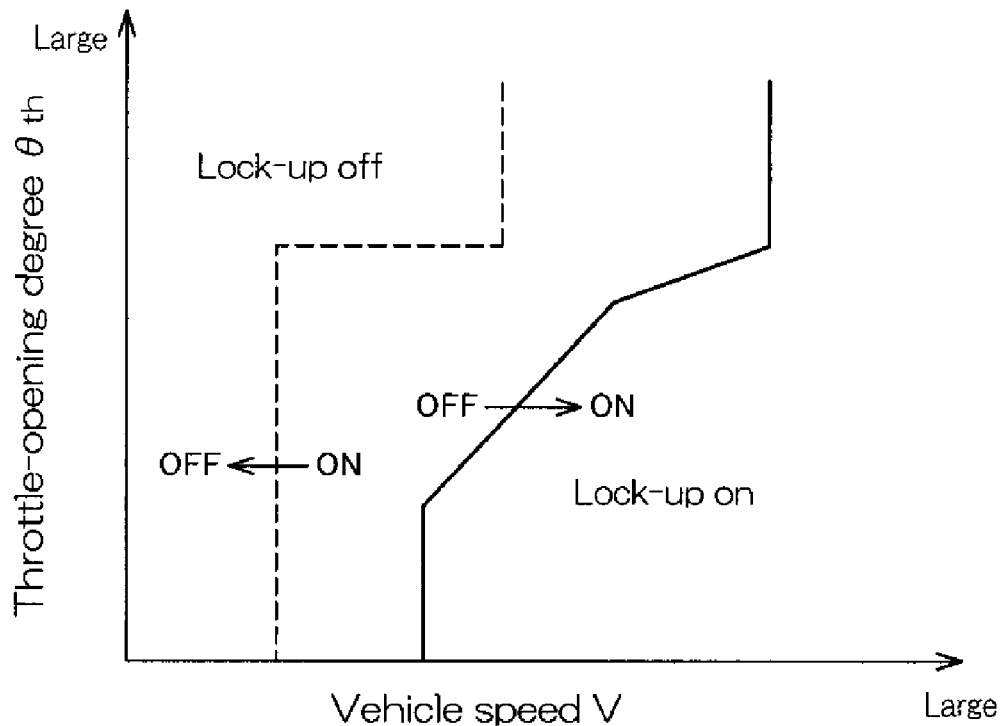
FIG. 5 is a view showing an example of a lock-up switching map.

In basic control engaging and disengaging the lock-up clutch 24, switching of engagement and disengagement of the lock-up clutch 24 in accordance with the actual throttle-opening degree "theta"th and vehicle speed V is carried out based on, for example, as shown in FIG. 5, a switching map (switching condition) recorded in advance with the vehicle speed V and the throttle-opening degree "theta"th corresponding to the input torque as parameters.

The switching map shown in FIG. 5 is set such that an engagement switching line shown by a solid line and a disengagement switching line shown by a dashed line have a prescribed amount of hysteresis. In this switching map shown in FIG. 5, if from a time at which the lock-up clutch 24 is at a disengagement condition (OFF), the vehicle speed V changes towards a high vehicle-speed side or the throttle-opening degree "theta"th changes towards a low throttle opening-degree side and the engagement switching line (solid line) is crossed, the lock-up clutch 24 is switched to the engagement condition (ON). Meanwhile, if from a time at which the lock-up clutch 24 is at an engagement condition (ON), the vehicle speed V changes towards a low vehicle-speed side or the throttle-opening degree "theta"th changes towards a high throttle opening-degree side and the disengagement switching line (dashed line) is crossed, the lock-up clutch 24 is switched to the disengagement condition (OFF).

—Deceleration Lock-Up Control—

When, during deceleration travel, that is to say, during forward travel wherein inertial travel takes place and the accelerator is OFF with the accelerator pedal not being subjected to a depression operation, if a prescribed deceleration lock-up control condition (for example, the throttle-opening degree "theta"th constitutes an idle opening degree, or the vehicle speed V is within a vehicle speed range set in advance, etc.) has been satisfied, the ECU 8 performs control (deceleration lock-up control) expanding a fuel-cut region (vehicle speed range) wherein provision of fuel to the engine 1 is stopped by controlling engagement of the lock-up clutch 24 to directly transmit reverse input force from an side of the drive wheels 7L, 7R to an engine 1 side such that the engine rotation speed NE is gradually reduced in accordance with deceleration of the vehicle. With deceleration lock-up control of this type, in order to prevent stalling of the engine in a case of, for example, sudden braking of a vehicle, etc., rapid disengagement of the lock-up clutch 24 is made possible by maintaining engagement of the lock-up clutch 24 with the lowest possible hydraulic pressure (low-pressure engagement pressure within a range where slipping does not occur).

With deceleration lock-up control of this type, in order, for example, to prevent stalling of the engine as a result of vehicle-speed reduction, rapid disengagement of the lock-up clutch 24 is made possible by maintaining engagement of the lock-up clutch 24 at a lowest-possible deceleration lock-up differential pressure (low-pressure engagement pressure) Pdec capable of withstanding auxiliary machinery load and friction of the engine when the accelerator is off (when non-driven), etc. The deceleration lock-up differential pressure Pdec of deceleration lock-up control is set within a range where slipping of the lock-up clutch 24 does not occur to a hydraulic pressure lower than a normal engagement pressure PLUON upon accelerator on (see FIG. 7).

—Lock-Up Smooth Off Control—

Lock-up smooth off control is control for disengaging the lock-up clutch as quickly as possible while suppressing disengagement shock upon deceleration lock-up control completion.

Figure 6:
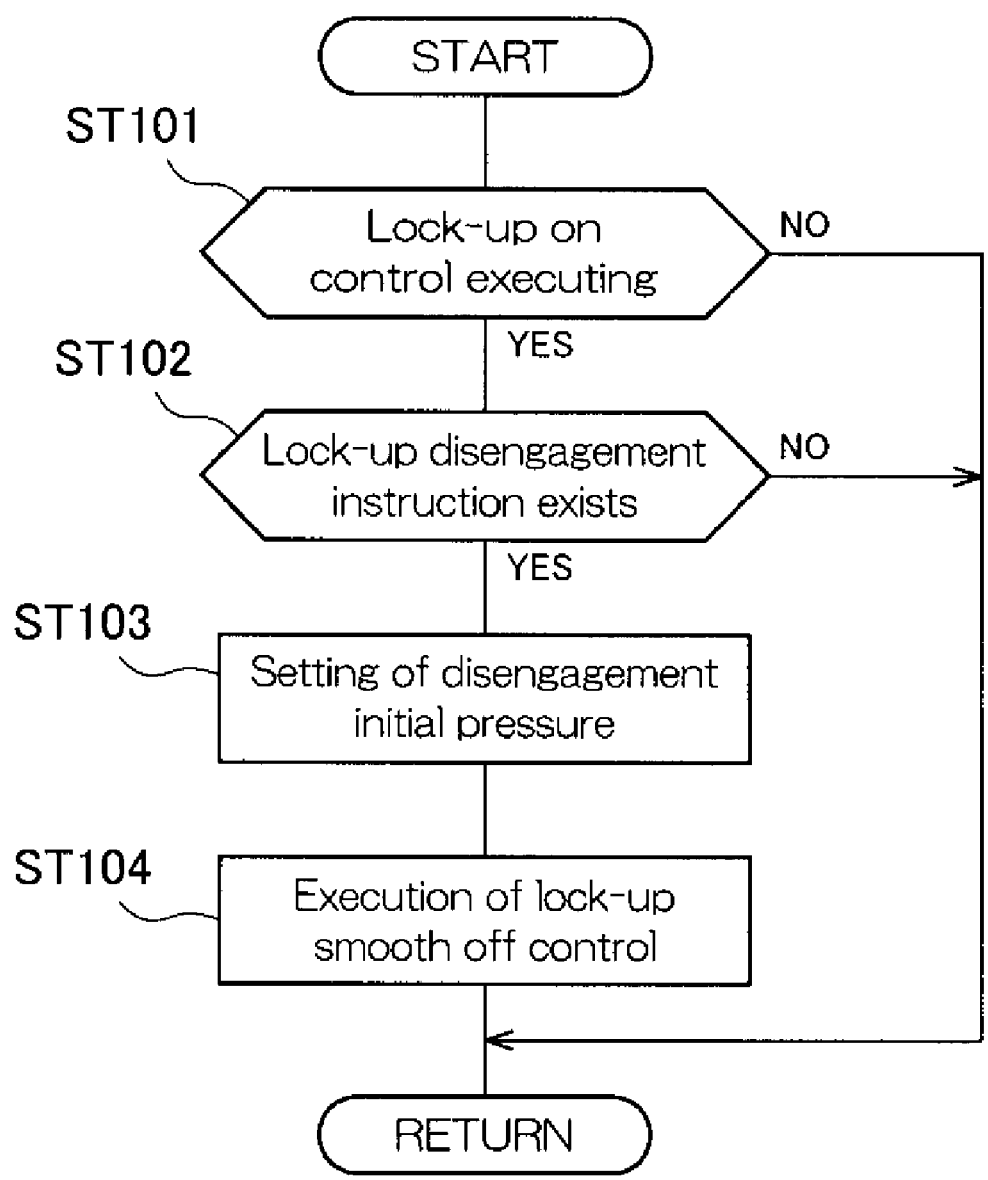
FIG. 6 is a flowchart showing an example of a control routine of lock-up smooth off control.

Hereinafter, an example of lock-up smooth off control is explained with reference to FIG. 6 and FIG. 7. FIG. 6 is a flowchart showing an example of a control routine of lock-up smooth off control. The control routine of FIG. 6 is executed repeatedly every prescribed interval within the ECU 8.

In a step ST101, it is determined whether or not lock-up on control engaging the lock-up clutch 24 at the normal engagement pressure PLUON or the deceleration lock-up differential pressure Pdec is executing, and in a case where the determination result thereof is a negative judgment, this routine is left once. In a case where the determination result of step ST101 is a positive judgment, or in other words, in a case where lock-up on control is executing, it proceeds to a step ST102.

In the step ST102, it is determined whether or not there is a disengagement instruction of the lock-up clutch 24 based on the switching map of FIG. 5 or a disengagement instruction of the lock-up clutch 24 as a result of satisfaction of another disengagement condition, and in a case where the determination result thereof is a positive judgment, it proceeds to a step ST103. In a case where the determination result of the step ST102 is a negative judgment, this routine is left once.

In the step ST103, a disengagement initial pressure PLUst of lock-up smooth off control is set, and in the step ST104, lock-up smooth off control is executed. In specific terms, as shown in FIG. 7, the disengagement initial pressure PLUst constituting an initial hydraulic pressure of lock-up smooth off control is set at a time is whereat there was a disengagement instruction of the lock-up clutch 24, and following this, a process is executed whereby the lock-up clutch is smoothly disengaged by gradually reducing the lock-up differential pressure at a fixed sweep gradient (a fixed rate of change) in an interval from the disengagement initial pressure PLUst to the disengagement hydraulic pressure.

Figure 8:
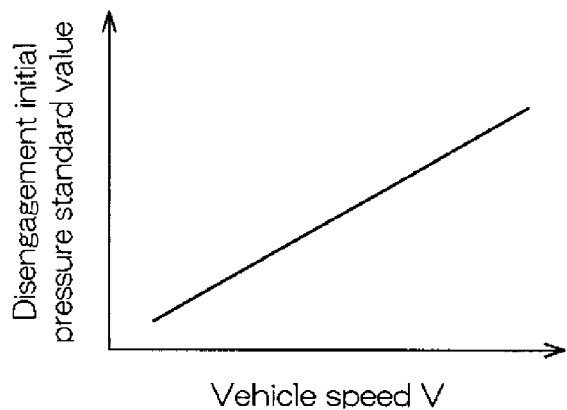
FIG. 8 is a view showing a map used in a calculation of a disengagement initial pressure standard value of lock-up smooth off control.

Here, in the lock-up smooth off control of this example, in order to quickly disengage the lock-up clutch 24, it is desirable that the disengagement initial pressure PLUst be set to the lowest possible hydraulic pressure in a range where the lock-up clutch 24 does not slip. The disengagement initial pressure PLUst is, in a case where the accelerator is off, set by referencing a map such as shown in FIG. 8 based, for example, on a vehicle speed V read from an output signal of the vehicle speed sensor 106 and obtaining a standard value for the disengagement initial pressure. When the accelerator is on, the disengagement initial pressure standard value can be obtained based on an engine load such as the throttle-opening degree "theta"th, etc.

It should be noted that, taking into consideration changing of the required clutch torque due to an auxiliary machinery load of an air conditioner and an alternator, etc. and changing of the clutch torque due to changes in, for example, responsiveness to viscous resistance and hydraulic pressure changes, etc. even in cases where a CVT oil temperature Thc is higher or lower than a prescribed range, the disengagement initial pressure PLUst may be obtained by calculating correction values thereof with reference to maps, etc. and adding the correction values to the standard value of the disengagement initial pressure. Furthermore, the disengagement initial pressure PLUst may also be set with other factors affecting a transmission torque of the lock-up clutch 24, such as a rate of change, etc. of the engine rotation speed NE, taken into consideration.

—Learning Control of Disengagement Initial Pressure of Lock-Up Smooth Off Control—

Figure 9:
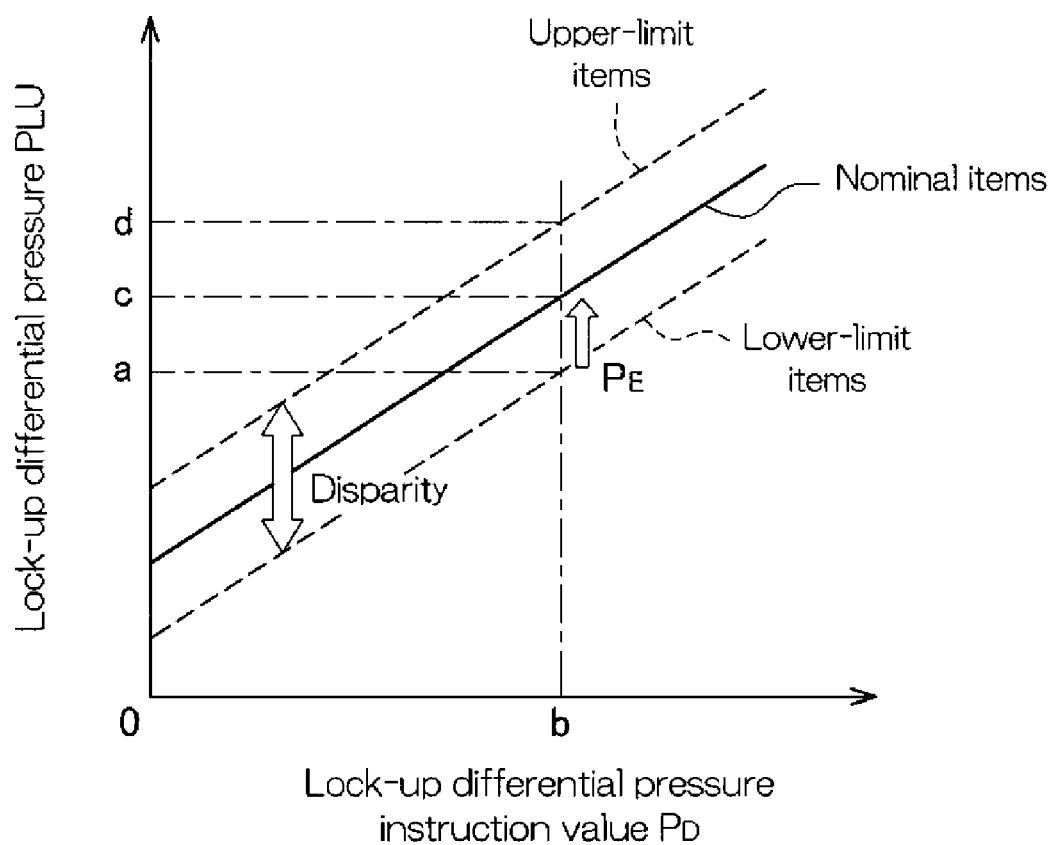
FIG. 9 is a graph showing a relationship between a lock-up differential pressure instruction value and a lock-up differential pressure.

First of all, in contrast to, for example, a hydraulic pressure characteristic of a nominal item as shown by a solid line in FIG. 9, a hydraulic pressure characteristic of the lock-up differential-pressure control solenoid valve DSU controlling the lock-up differential pressure PLU, or in other words, a relationship between the lock-up differential pressure instruction value PD and the lock-up differential pressure PLU has disparity (tolerance) as shown by a dashed line.

Furthermore, a map with nominal items as standard as shown by a solid line in FIG. 9 is, in this example, set as a conversion map for calculating a lock-up differential pressure instruction value PD based on a target value of a lock-up differential pressure PLU, and the lock-up differential pressure instruction value PD is calculated based on that conversion map and in accordance with the target value of the lock-up differential pressure PLU. Therefore, in a case where the hydraulic pressure characteristic corresponds to lower limit items, when the lock-up differential pressure PLU (the target value with nominal items as standard) is [c], as shown in FIG. 9, the lock-up differential pressure instruction value PD becomes [b]; however, there is a possibility that the actual lock-up differential pressure PLU will become a value [a] lower than [c] and the lock-up differential pressure PLU will be insufficient.

Figure 10:
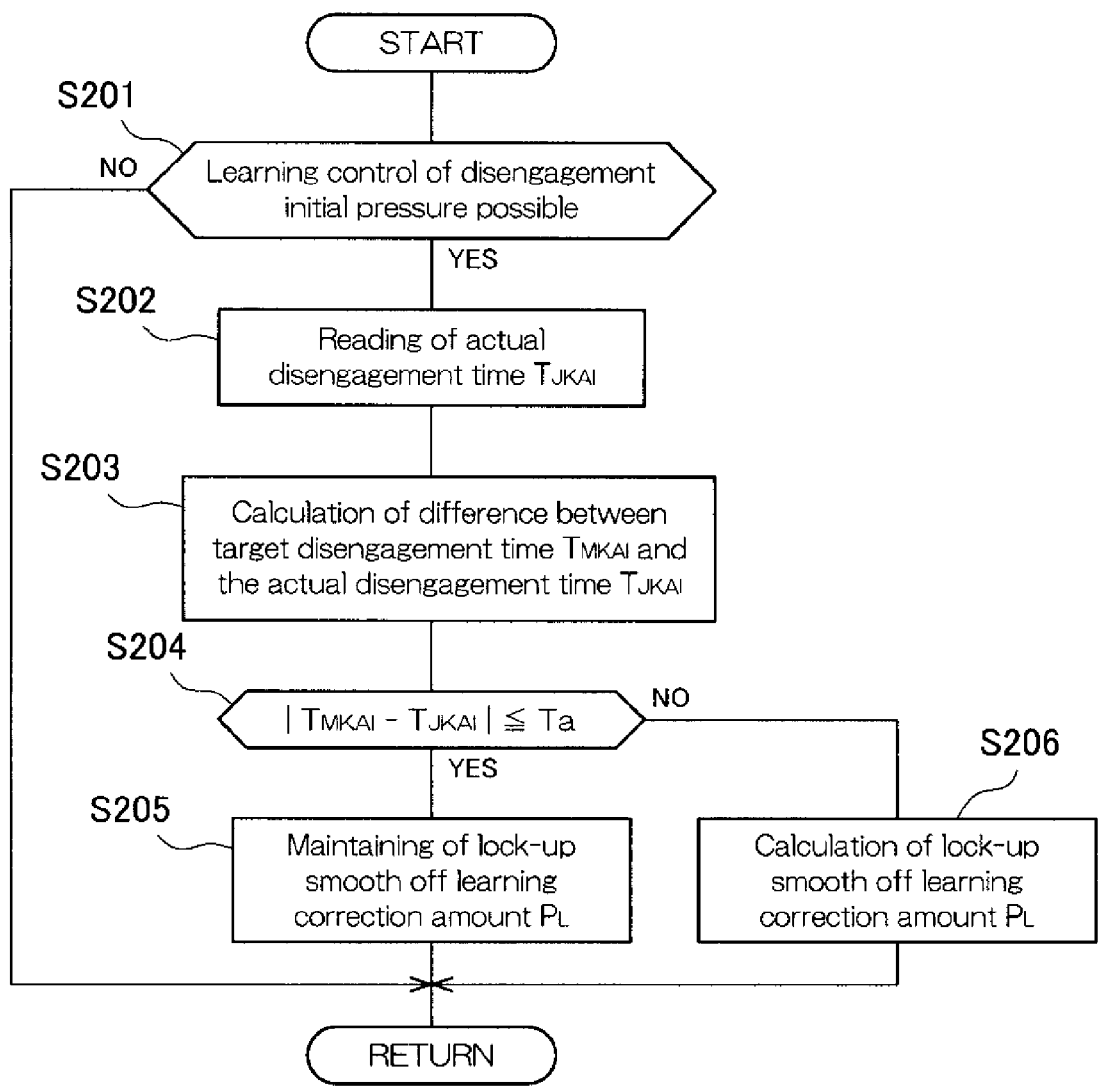
FIG. 10 is a flowchart showing an example of a control routine of a calculation process of a lock-up smooth off learning correction amount.

In this example, the disengagement initial pressure (instruction value) PS of lock-up smooth off control is corrected using the lock-up smooth off learning correction amount PL in order to absorb such disparity in the hydraulic pressure characteristic of the lock-up differential-pressure control solenoid valve DSU or disparity in hydraulic pressure control due to other individual differences. Hereinafter, an example of a calculation process for the lock-up smooth off learning correction amount PL is explained with reference to the flowchart of FIG. 10. The control routine of FIG. 10 is executed repeatedly every prescribed interval within the ECU 8.

First of all, in a step ST201, it is determined whether or not learning control of the disengagement initial pressure PLUst is possible at each execution of lock-up smooth off control, and in a case where the determination result thereof is a positive judgment, it proceeds to a step ST202. In a case where the determination result of the step ST201 is a negative judgment, this routine is left once.

A permission standard for learning control as used in the determination of this step ST201 is set based on whether or not learning control can be executed appropriately, and learning control is not permissible when, for example, a sensor is abnormal, an engine cooling water temperature Thw is lower than a prescribed value, manual gear-shifting is being carried out through a shift-lever operation, or the vehicle is performing a sudden stop, etc. It should be noted that, in a case where hydraulic pressure correction due to an auxiliary machinery load or hydraulic pressure correction due to the CVT oil temperature Thc is not executed, it is desirable that learning control is deemed not permissible when the auxiliary load or CVT oil temperature Thc leaves a prescribed range.

In the step ST202, the actual disengagement time TJKAI during lock-up smooth off control is read. The actual disengagement time TJKAI is a period of time from the time is whereat lock-up smooth off control was started due to a disengagement instruction as shown in FIG. 7 until a time (lock-up off time) tr whereat the lock-up clutch 24 begins actual relative rotation (slip). Determination of whether or not the lock-up clutch 24 has become off (disengagement) is made by determining whether or not a rotation speed difference between the engine rotation speed NE and the turbine rotation speed NT has become equal to or larger than a prescribed amount (for example, 100 rpm).

Next, in a step ST203, a difference between the target disengagement time TMKAI (for example, 1 second) and the actual disengagement time TJKAI is obtained, and it is determined (a step ST204) whether or not an absolute value of that difference (|TMKAI−TJKAI|) is within a permissible value Ta. In a case where the determination result of the step ST204 is a positive judgment (|TMKAI−TJKAI|"<="Ta), the current lock-up smooth off learning correction amount PL is maintained as is (a step ST205).

Meanwhile, in a case where the absolute value of the difference between the actual disengagement time TJKAI and the target disengagement time TMKAI (|TMKAI−TJKAI|) is larger than the permissible value Ta (in a case where the determination result of the step ST204 is a negative judgment), the lock-up smooth off learning correction amount PL is calculated (a step ST206). In specific terms, the lock-up smooth off learning correction amount PL for correction of the disengagement initial pressure PLUst (hydraulic pressure instruction value PS) of lock-up smooth off control so as to eliminate the difference between the actual disengagement time TJKAI and the target disengagement time TMKAI is calculated. That calculated lock-up smooth off learning correction amount PL is sequentially recorded and updated, for example, in the RAM 83 of the ECU 8.

Here, an initial value of the lock-up smooth off learning correction amount PL calculated in the above-mentioned learning control of the disengagement initial pressure is 0, and if the hydraulic-pressure control components such as the lock-up differential-pressure control solenoid valve DSU are nominal items, the lock-up smooth off learning correction amount PL is maintained at approximately 0. In contrast to this, in a case of lower limit items, a positive lock-up smooth off learning correction amount PL is set in order to make the disengagement initial pressure PLUst of lock-up smooth off control larger, and in the case of higher limit items, a negative lock-up smooth off learning correction amount PL is set in order to make the disengagement initial pressure PLUst smaller.

In the step ST103 of the lock-up smooth off control of FIG. 6 as explained above, the disengagement initial pressure PLUst is set using the lock-up smooth off learning correction amount PL, and in the step ST104, the lock-up differential pressure PLU is reduced quickly and without stopping to the disengagement initial pressure PLUst, and in addition, the target hydraulic pressure is gradually reduced from that disengagement initial pressure PLUst at a prescribed sweep gradient (constant rate of change).

Figure 7:
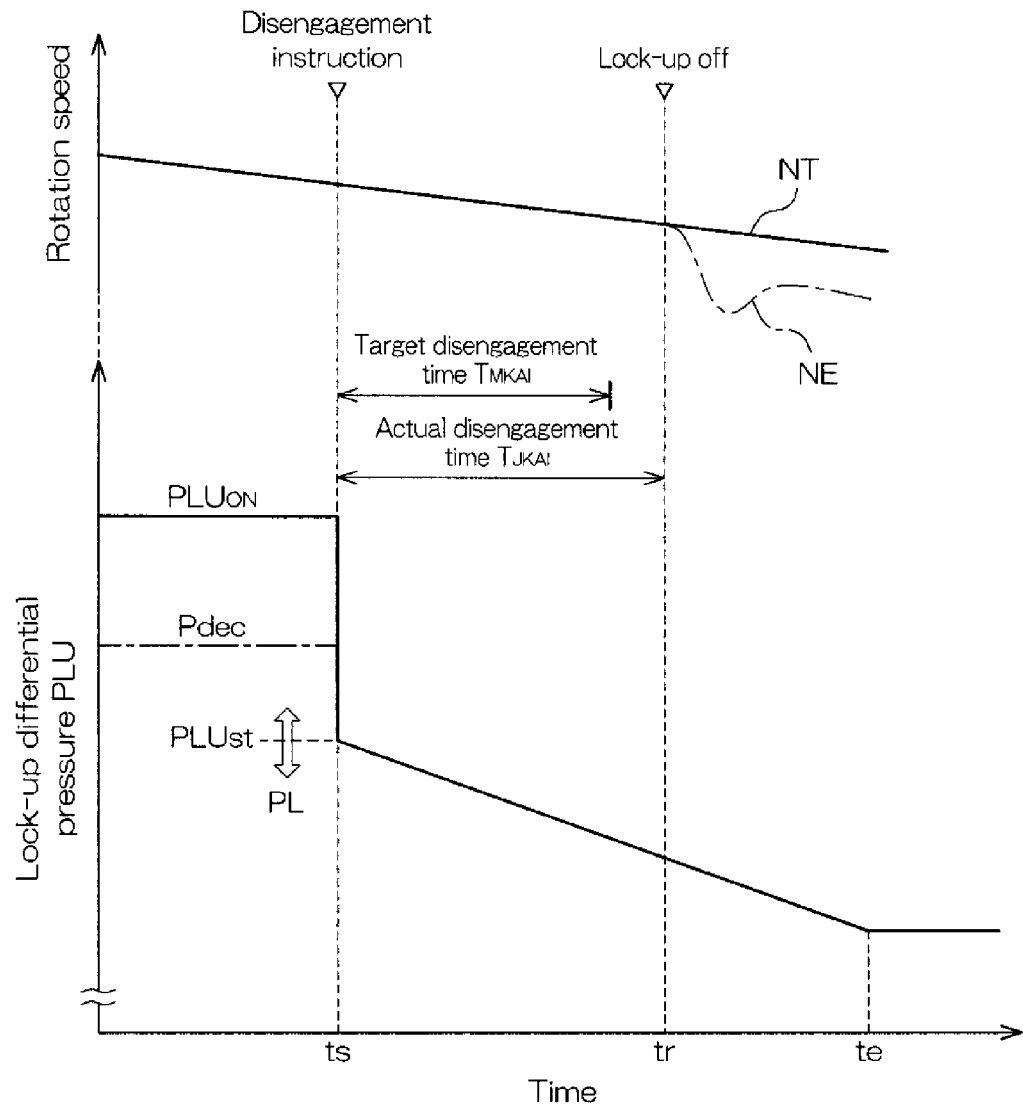
FIG. 7 is a timing chart showing a change in a hydraulic pressure control value during deceleration lock-up control and lock-up smooth off control.

In specific terms, the lock-up differential pressure PLU shown in FIG. 7 is the target value, the lock-up differential pressure instruction value PD is sequentially calculated according to that lock-up differential pressure PLU and in line with the conversion map shown by the solid line of FIG. 9, and an excitation current of the lock-up differential-pressure control solenoid valve DSU is duty controlled in accordance with that lock-up differential pressure instruction value PD (also including PS). In such a case, as the disengagement initial pressure PLUst of lock-up smooth off control is learning corrected in accordance with the actual disengagement time TJKAI, an appropriate disengagement initial pressure PLUst reflecting the hydraulic characteristic of the actually-mounted lock-up differential-pressure control solenoid valve DSU is set, and lock-up smooth off control is executed appropriately such that the actual disengagement time TJKAI will match the target disengagement time TMKAI. It should be noted that a time to of FIG. 7 is a completion time of lock-up smooth off control, and the lock-up clutch 24 is disengaged at an earlier lock-up off time tr.

—Deceleration Lock-Up Differential Pressure Learning Control—

It should be noted that, although learning correction of the control hydraulic pressure in the same way as the disengagement initial pressure PLUst of the above-explained lock-up smooth off control is desirable in deceleration lock-up control also, the lock-up clutch 24 needs to be reliably maintained in an engagement condition at the deceleration lock-up differential pressure Pdec during deceleration lock-up control, and therefore, execution of feedback control of the deceleration lock-up differential pressure Pdec and learning correction are difficult.

For this reason, in conventional control, in order that the lock-up clutch 24 does not adopt a slip condition despite disparity (individual differences) in the hydraulic pressure characteristic, etc. of the lock-up differential-pressure control solenoid valve DSU, the deceleration lock-up differential pressure Pdec was set a little larger in consideration of that hydraulic pressure disparity. That is to say, with regard to the lock-up differential-pressure control solenoid valve DSU, the deceleration lock-up differential pressure Pdec was conventionally set to a hydraulic pressure higher by the hydraulic pressure disparity correction amount PE assuming the lower limit items as shown in FIG. 9.

For this reason, as deceleration lock-up differential pressure control is executed at a deceleration lock-up differential pressure Pdec higher by the hydraulic pressure disparity correction amount PE, the lock-up differential pressure of the lock-up clutch 24 can be appropriately controlled in a case where the actually-mounted hydraulic-pressure control components such as the lock-up differential-pressure control solenoid valve DSU, etc. are lower limit items. However, the actual deceleration lock-up differential pressure Pdec is a hydraulic pressure higher than a desired value by the hydraulic pressure disparity correction amount PE in a case of nominal items and is an even higher pressure in a case of upper limit items, and a problem exists in the form of control to a higher-than-required hydraulic pressure.

Taking this point into consideration, the lock-up smooth off learning correction amount PL is diverted to deceleration lock-up control in this example, and control is executed so as to set the lowest possible deceleration lock-up differential pressure Pdec required in accordance with the hydraulic characteristic, etc. of the actually-mounted lock-up differential-pressure control solenoid valve DSU. That is to say, as the hydraulic pressure characteristic, etc. of the actually-mounted lock-up differential-pressure control solenoid valve DSU is reflected in the lock-up smooth off learning correction amount PL used for correction of the disengagement initial pressure PLUst of lock-up smooth off control, by updating the deceleration lock-up differential pressure Pdec of deceleration lock-up control to reflect that lock-up smooth off learning correction amount PL, the deceleration lock-up differential pressure Pdec can be appropriately lowered while a slip condition of the lock-up clutch 24 can be avoided.

Figure 11:
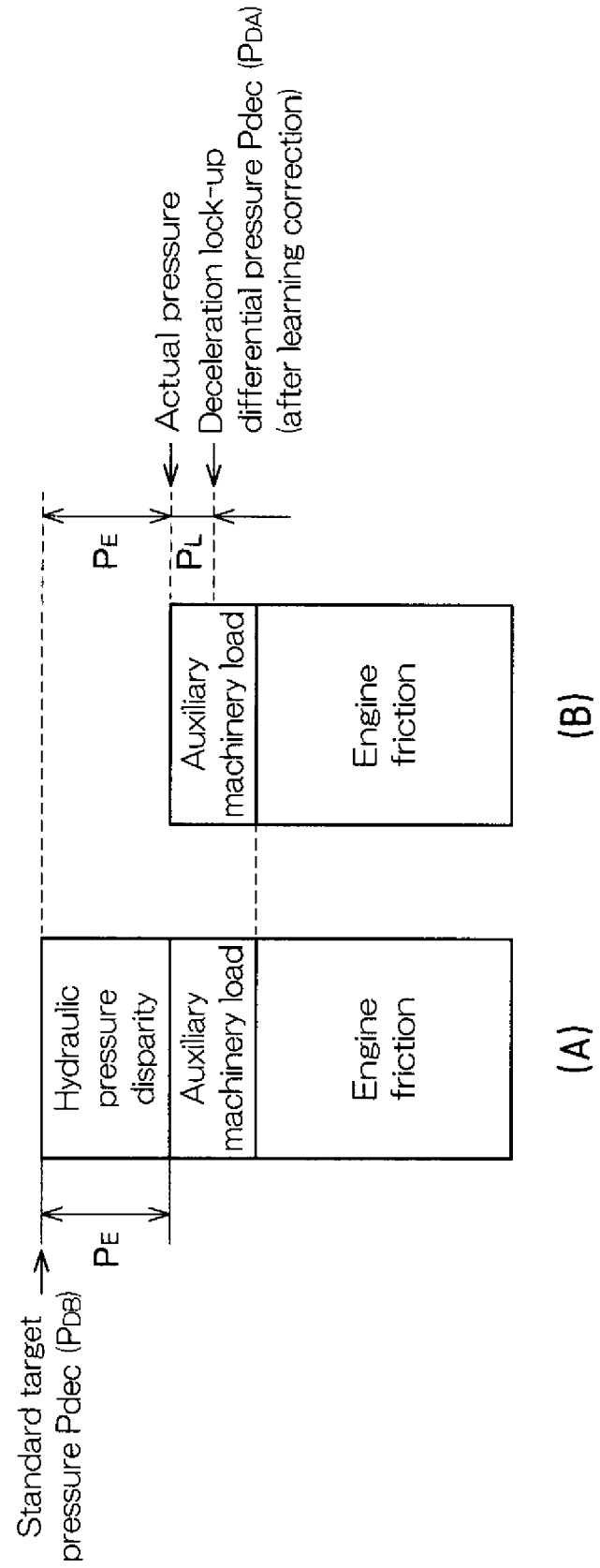
FIG. 11 is a view showing process details of deceleration lock-up differential pressure learning control in specific terms.

In specific terms, for example, in a case where, as shown in FIG. 11 (A), a standard target pressure of the deceleration lock-up differential pressure Pdec of before deceleration lock-up differential pressure learning control is set to a value higher by the hydraulic pressure disparity correction amount PE than a minimum hydraulic pressure capable of withstanding a negative torque of engine friction and an auxiliary machinery load during deceleration lock-up control, if the lock-up smooth off learning correction amount PL is learned through learning control of the disengagement initial pressure of lock-up smooth off control, as shown in FIG. 11 (B), appropriate control to a minimum deceleration lock-up differential pressure (actual pressure) matched to the negative torque of engine friction and the auxiliary machinery load is possible by reflecting that lock-up smooth off learning correction amount PL in deceleration lock-up control and setting the deceleration lock-up differential pressure Pdec to [Pdec=Standard target pressure−(Hydraulic pressure disparity correction amount PE (known)+Lock-up smooth off learning correction amount PL)]. It should be noted that, in a case where the lock-up smooth off learning correction amount PL is negative, the deceleration lock-up differential pressure Pdec is learning corrected as [Pdec=Standard target pressure−(Hydraulic pressure disparity correction amount PE−Lock-up smooth off learning correction amount PL)].

With the deceleration lock-up differential pressure Pdec of after learning correction as obtained in the above-mentioned process as the target hydraulic pressure, the lock-up differential pressure instruction value PDA (see FIG. 12) is then calculated based on the conversion map shown by the solid line of FIG. 9 as explained above, and by executing duty control of the excitation current of the lock-up differential-pressure control solenoid valve DSU as shown in FIG. 2 in accordance with that lock-up differential pressure instruction value PDA, the deceleration lock-up differential pressure Pdec can be appropriately lowered while a slip condition of the lock-up clutch 24 can be avoided.

Figure 12:
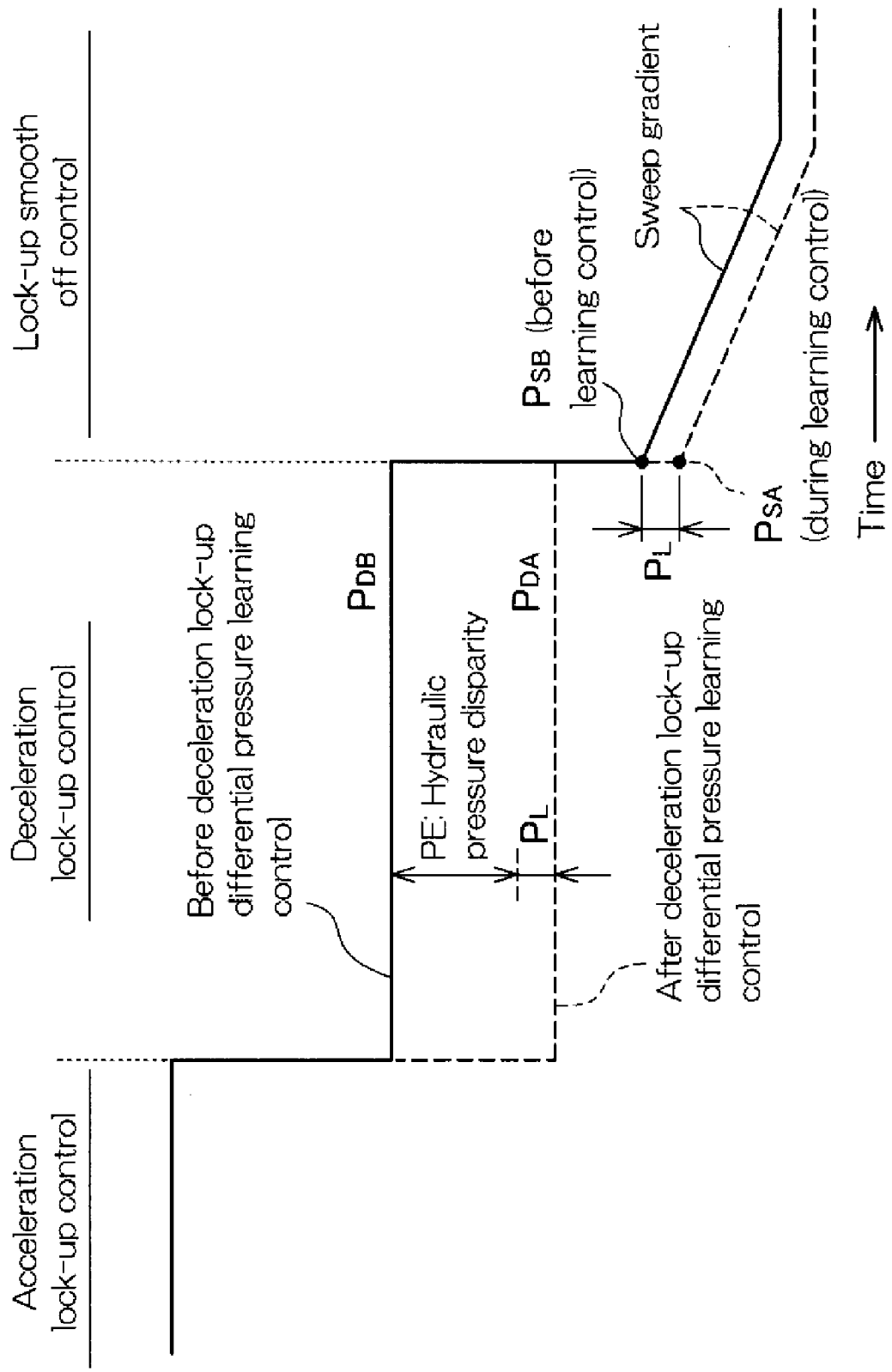
FIG. 12 is a timing chart showing an operation of deceleration lock-up differential pressure learning control.

A relationship between the lock-up differential pressure instruction value PDB of before the above-mentioned deceleration lock-up differential pressure learning control, the lock-up differential pressure instruction value PDA of after learning control, the hydraulic pressure disparity correction amount PE, the disengagement initial pressure instruction values PSB (before learning control) and PSA (after learning control) of lock-up smooth off control, and the lock-up smooth off learning correction amount PL is shown in FIG. 12. As can be understood from this FIG. 12, a difference (PDA−PSA) between the lock-up differential pressure instruction value PDA of deceleration lock-up control and the disengagement initial pressure instruction value (lock-up differential pressure instruction value) PSA of lock-up smooth off control is, upon entry into deceleration lock-up differential pressure learning control, smaller than a lock-up differential pressure instruction value difference (PDB−PSB) of before deceleration lock-up differential pressure learning control.

—Learning Value Correction Control of Disengagement Initial Pressure of Lock-Up Smooth Off Control—

First of all, when deceleration lock-up differential pressure learning control has been entered, the difference between the lock-up differential pressure instruction value PDA of deceleration lock-up control and the disengagement initial pressure instruction value (lock-up differential pressure instruction value) PSA of lock-up smooth off control becomes small as explained above. When the difference (PDA−PSA) of the lock-up differential pressure instruction values becomes smaller than before deceleration lock-up differential pressure learning control in this way, the actual lock-up differential pressure starts to track the target hydraulic pressure in lock-up smooth off control, as shown by a dashed line in FIG. 17, and delay of an actual disengagement time TJKAI with respect to a target disengagement time TMKAI becomes a concern.

Furthermore, although the difference (PDA−PSA) between the lock-up differential pressure instruction value PDA of deceleration lock-up control and the disengagement initial pressure instruction value PSA of lock-up smooth off control is small during deceleration lock-up differential pressure learning control and undershoot whereby the actual lock-up differential pressure during lock-up smooth off control becomes lower than the target lock-up differential pressure no longer occurs, shock upon disengagement of the lock-up clutch becomes a concern in such a condition if lock-up smooth off control is executed using the large sweep gradient of before deceleration lock-up differential pressure learning control unchanged.

Taking this type of point into consideration, correction of the disengagement initial pressure learning value of lock-up smooth off control is performed in this example. Hereinafter, a specific example of that correction process is explained with reference to FIG. 13.

Figure 13:
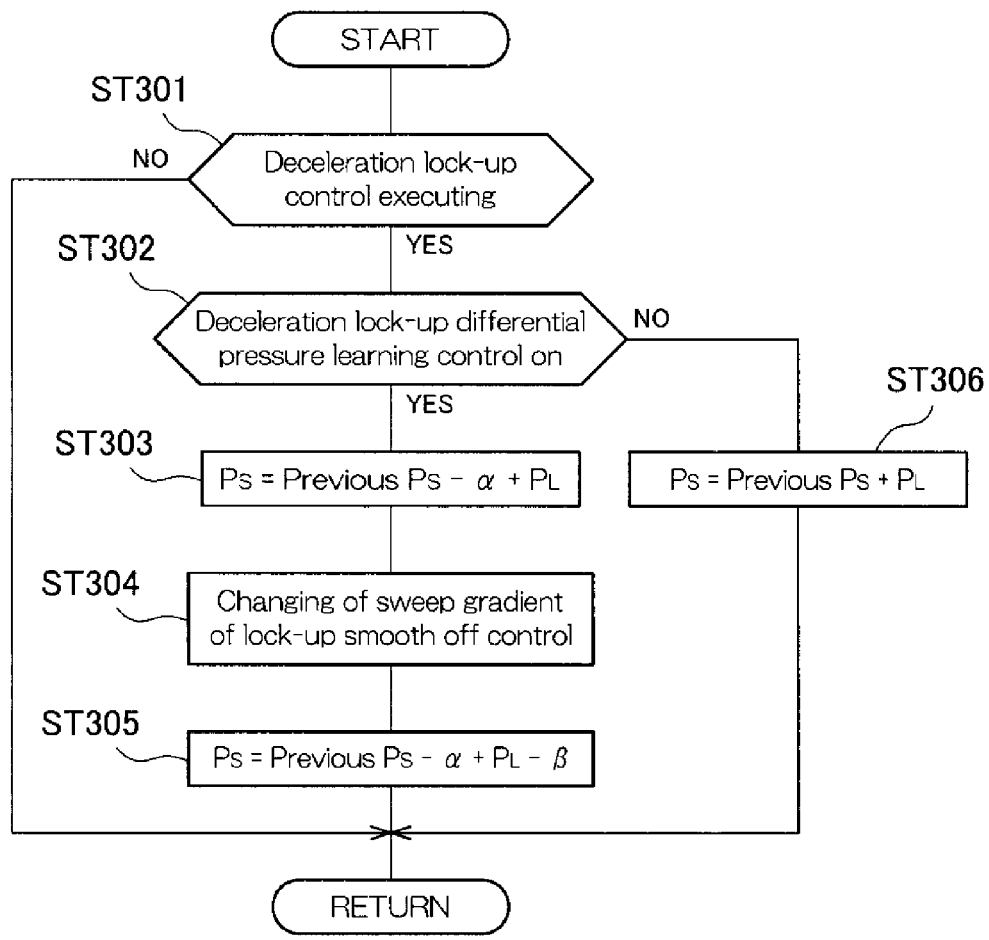
FIG. 13 is a flowchart showing an example of a control routine of learning value correction control of the disengagement initial pressure.

FIG. 13 is a flowchart showing an example of a control routine of learning correction of the disengagement initial pressure. The flowchart of FIG. 13 is executed repeatedly every prescribed interval within the ECU 8. It should be noted that, in this explanation of the learning value correction of the disengagement initial pressure, "PD" is an instruction value of the deceleration lock-up differential pressure during deceleration lock-up control and "PS" is an instruction value of the disengagement initial pressure of lock-up smooth off control.

First of all, in a step ST301, it is determined whether or not deceleration lock-up control is being executed, and in a case where the determination result thereof is a positive judgment, it proceeds to a step ST302. In a case where the determination result of the step ST301 is a negative judgment, this routine is ended once.

In the step ST302, it is determined whether or not deceleration lock-up differential pressure learning control has been entered (deceleration lock-up differential pressure learning control on), and in a case where the determination result thereof is a negative judgment (a case of before deceleration lock-up differential pressure learning control), it proceeds to a step ST306. In the step ST306, the lock-up smooth off learning correction amount PL is calculated by the above-explained process of FIG. 10, and the disengagement initial pressure instruction value PS of lock-up smooth off control is corrected (PS=Previous PS+PL).

Meanwhile, in a case where the determination result of the step ST302 is a positive judgment (a case where deceleration lock-up differential pressure learning control has been entered), it proceeds to a step ST303.

In the step ST303, a correction amount "alpha" of the learning value of the disengagement initial pressure is calculated based on a difference between the lock-up differential pressure instruction value PD of deceleration lock-up control and the instruction value PS of the disengagement initial pressure of lock-up smooth off control, and the disengagement initial pressure instruction value PS of lock-up smooth off control is obtained.

Figure 14:
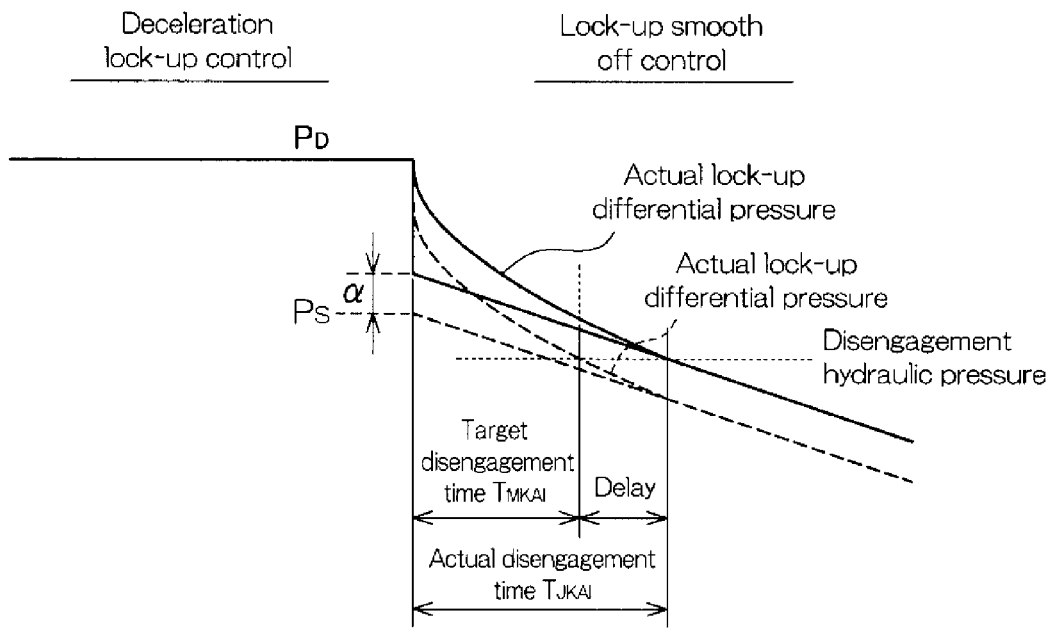
FIG. 14 is an explanatory view of a correction amount "alpha" of the disengagement initial pressure learning value of lock-up smooth off control.
Figure 17:
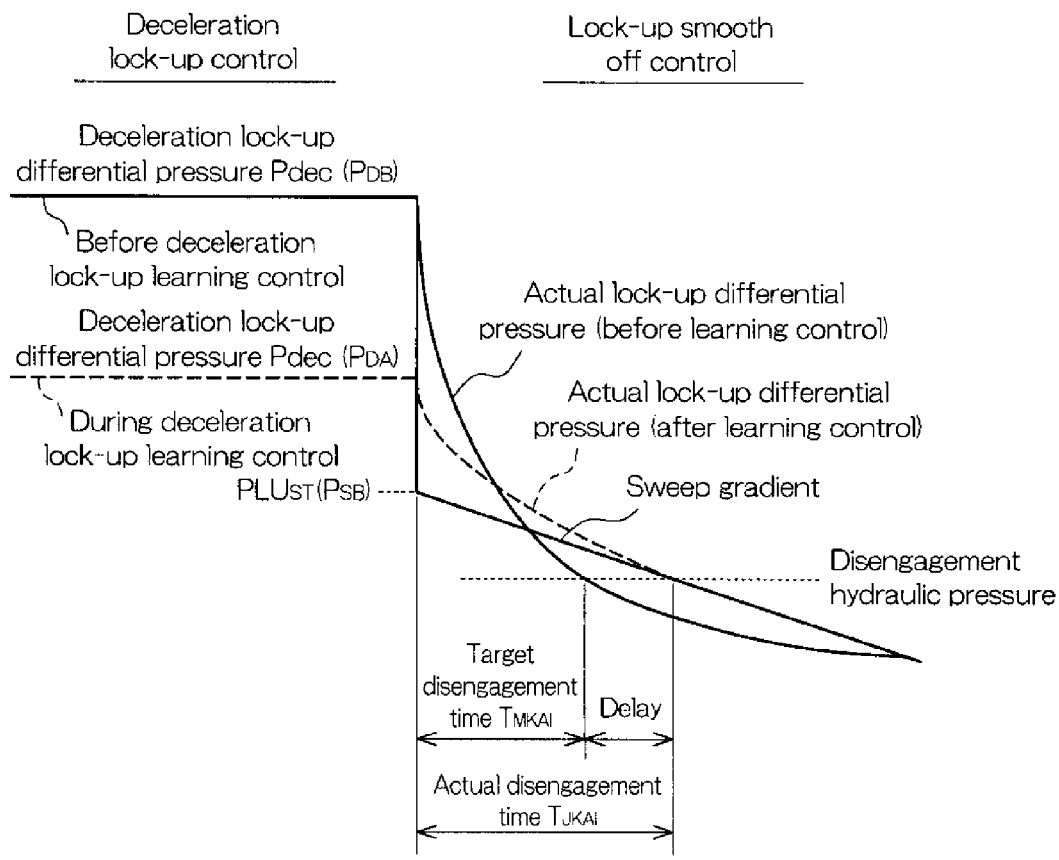
FIG. 17 is a timing chart showing a target hydraulic pressure and an actual lock-up differential pressure during lock-up smooth off control.
Figure 18:
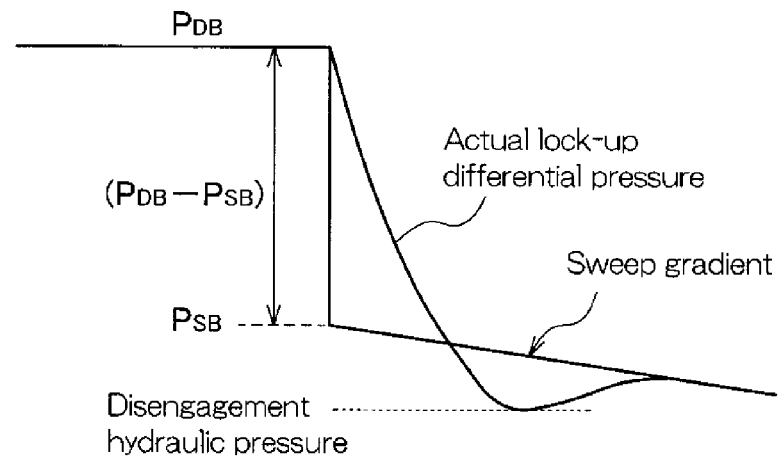
FIG. 18 is a timing chart showing a sweep gradient and the actual lock-up differential pressure during lock-up smooth off control.

In specific terms, if the difference (PD−PS) between the lock-up differential pressure instruction value PD of deceleration lock-up control and the disengagement initial pressure instruction value PS of lock-up smooth off control becomes small, the actual lock-up differential pressure starts to track the target hydraulic pressure, as shown by a dashed line in FIG. 17, and a difference (delay amount) between the target disengagement time TMKAI and the actual disengagement time TJKAI becomes large. That is to say, as the learning value of the disengagement initial pressure of lock-up smooth off control becomes large, the actual disengagement time TJKAI can, as shown in FIG. 14, be matched to the target disengagement time TMKAI and disengagement delay of the lock-up clutch 24 can be eliminated by calculating the correction amount "alpha" so as to cancel out a learning-value increase portion of that disengagement initial pressure and correcting the disengagement initial pressure instruction value PS of lock-up smooth off control using this correction amount "alpha" (PS=Previous PS−"alpha"+PL).

Figure 16:
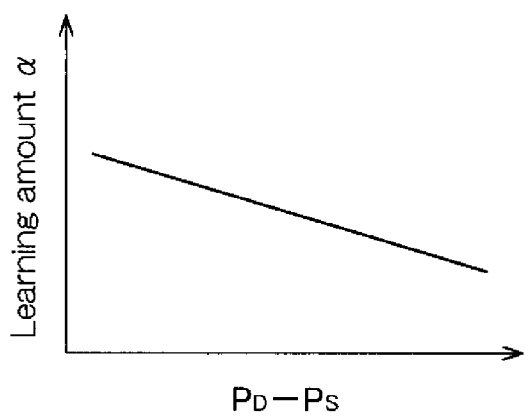
FIG. 16 is a view showing both a map (A) used in calculating the correction amount "alpha" of the disengagement initial pressure learning value and a map (B) used in calculating the sweep gradient "theta"SA of lock-up smooth off control.
Figure 16:
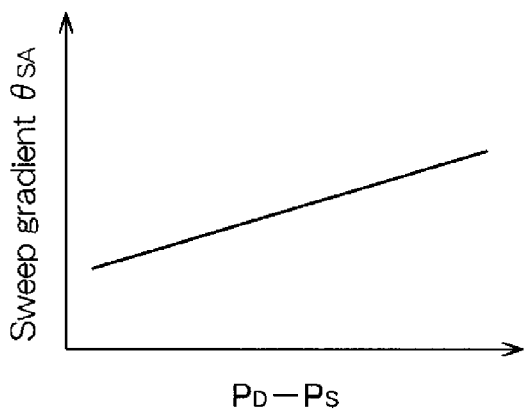

It should be noted that the correction amount "alpha" is calculated by referencing a map as shown in FIG. 16 (A). Correction amounts "alpha" for elimination of the difference between the target disengagement time TMKAI and the actual disengagement time TJKAI as obtained empirically through advance testing and calculation, etc. with the difference (PD−PS) between the lock-up differential pressure instruction value PD of deceleration lock-up control and the disengagement initial pressure (instruction value) PS of lock-up smooth off control as a parameter are formed as a map in order to realize the map for calculation of the correction amount "alpha", and the map is stored in the ROM 82 of the ECU 8. It should be noted that, in the map of FIG. 16 (A), the correction amount "alpha" is set so as to become larger as the difference (PD−PS) between the lock-up differential pressure instruction value PD of deceleration lock-up control and the disengagement initial pressure (instruction value) PS of lock-up smooth off control becomes smaller.

Next, in a step ST304, the sweep gradient of lock-up smooth off control is changed. This sweep gradient change is explained hereinafter.

First of all, during deceleration lock-up differential pressure learning control, the difference between the lock-up differential pressure instruction value PD of deceleration lock-up control and the disengagement initial pressure instruction value PS of lock-up smooth off control becomes small, and therefore, undershoot of the actual lock-up differential pressure during lock-up smooth off control no longer occurs. In such a condition, shock upon disengagement of the lock-up clutch becomes a concern if lock-up smooth off control is executed using the large sweep gradient of before deceleration lock-up differential pressure learning control unchanged. In order to eliminate this, a sweep gradient "theta"SA of lock-up smooth off control during deceleration lock-up differential pressure learning control is, in this example, changed to a value smaller than the sweep gradient of before deceleration lock-up differential pressure learning control. In specific terms, the sweep gradient "theta"SA of after the change is calculated by referencing a map based on the disengagement initial pressure instruction value PS.

Sweep gradients "theta"SA for ensuring that shock upon lock-up clutch disengagement does not occur as obtained empirically through advance testing and calculation, etc. with the difference (PD−PS) between the lock-up differential pressure instruction value PD of deceleration lock-up control and the current disengagement initial pressure instruction value PS of lock-up smooth off control as a parameter are formed as a map in order to realize the map for calculation of the sweep gradient "theta"SA after the change, and the map is stored in the ROM 82 of the ECU 8. It should be noted that, in the map of FIG. 16 (B), the sweep gradient "theta"SA is set so as to become smaller as the difference (PD−PS) between the lock-up differential pressure instruction value PD of deceleration lock-up control and the disengagement initial pressure (instruction value) PS of lock-up smooth off control becomes smaller.

Figure 15:
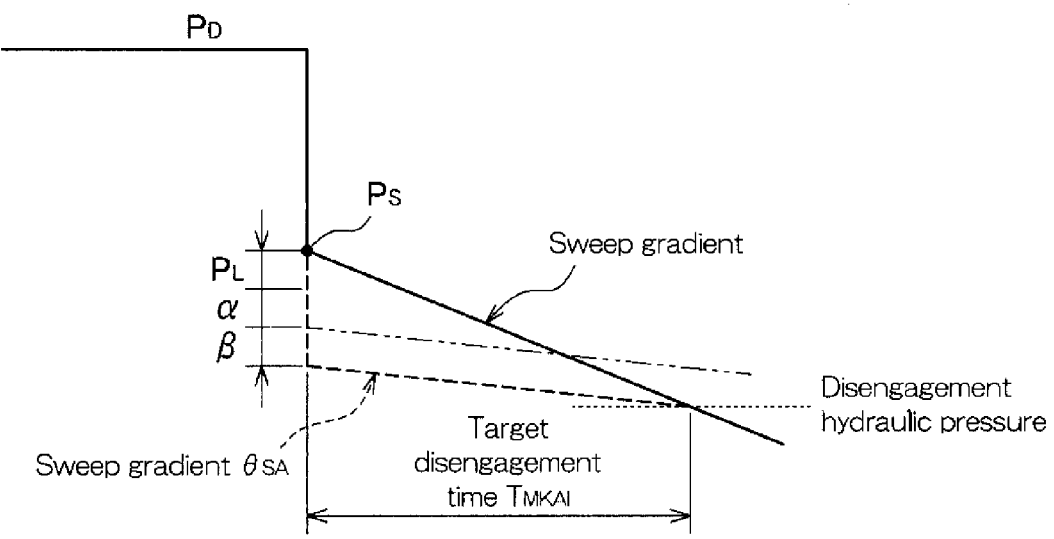
FIG. 15 is an explanatory view of a correction amount "beta" of the disengagement initial pressure learning value and a sweep gradient "theta"SA of lock-up smooth off control during deceleration lock-up differential pressure learning control.

Here, when the sweep gradient of lock-up smooth off control becomes small, as shown in FIG. 14, the actual disengagement time TJKAI may become longer than the target disengagement time TMKAI. Taking this point into consideration, in this example, the disengagement initial pressure instruction value PS of lock-up smooth off control is corrected to a small side (a step ST305). In specific terms, a correction amount "beta" as shown in FIG. 15 is obtained based on the sweep gradient "theta"SA after the change and the target disengagement time TMKAI, the disengagement initial pressure instruction value PS (PS=Previous PS−"alpha"+PL−"beta") of lock-up smooth off control is calculated using the correction amount "beta", and a next lock-up smooth off control is executed using this calculated disengagement initial pressure instruction value PS of lock-up smooth off control.

As a result of execution of the processes of the above-mentioned steps ST301 to ST305 repeatedly in sequence, the disengagement initial pressure instruction value PS of lock-up smooth off control converges, and the actual disengagement time TJKAI will match the target disengagement time TMKAI.

In the correction control of this example, as mentioned above, upon entry into deceleration lock-up differential pressure learning control, the disengagement initial pressure learning value of lock-up smooth off control is corrected to a low side in accordance with the difference (PD−PS) between the lock-up differential pressure instruction value PD of deceleration lock-up control and the disengagement initial pressure instruction value PS of lock-up smooth off control. Furthermore, as the sweep gradient of lock-up smooth off control changes to a small side in accordance with the difference (PD−PS) between the lock-up differential pressure instruction value PD and the disengagement initial pressure instruction value PS, and in addition, the disengagement initial pressure learning value of lock-up smooth off control is corrected to a low side, lock-up smooth off control can be executed with a sweep gradient suitable for the deceleration lock-up differential pressure instruction value, and in addition, disengagement delay of the lock-up clutch 24 can be eliminated. As a result of this, shock upon disengagement of the lock-up clutch 24 can be suppressed more effectively.

Other Embodiments

Although both correction of the disengagement initial pressure during deceleration lock-up differential pressure learning control and correction of the sweep gradient of lock-up smooth off control during deceleration lock-up differential pressure learning control (including correction of the disengagement initial pressure during sweep gradient correction) are executed in the above example, either of the corrections may be executed.

Although the above example shows an example of application of the present invention in lock-up clutch control of a vehicle where a belt-type continuously variable transmission (CVT) is mounted, the present invention is not limited to this, and application is possible also in lock-up clutch control of a vehicle where a planetary-gear type transmission setting a gear ratio using a clutch, a brake, and a planetary gear device is mounted.

Although the above example shows an example of application of the present invention in lock-up clutch control of a vehicle where a torque converter is mounted as a fluid-type transmission device, the present invention is not limited to this, and application is possible also in lock-up clutch control of a vehicle where a fluid coupling (including a lock-up clutch) is mounted.

Although the above example shows an example of application of the present invention in lock-up clutch control of a vehicle where a gasoline engine is mounted, the present invention is not limited to this, and application is possible also in lock-up clutch control of a vehicle where another engine such as a diesel engine, etc. is mounted.

Furthermore, the motive power source of the vehicle may, other than an engine (internal combustion engine), be an electric motor or a hybrid-type motive power source comprising an engine and an electric motor.

Note that some symbol characters are described as alphabetical characters as shown below in this specification. Individual alphabetical characters "alpha", "beta", "gamma", "theta", "+/−", and "<=" correspond to respective symbol characters

α

,

β

,

γ

,

θ

,

±

, and

≦

.

It should be noted that without departure from the spirit or principal characteristics thereof, the present invention can have many other embodiments. Accordingly, the above-described embodiments are no more than mere examples and should not be interpreted in a limited manner. The scope of the present invention is set forth by the scope of the claims, and the disclosure is in no way binding. Furthermore, all modifications and changes within a scope equivalent to that of the claims are within the scope of the present invention.

Furthermore, this application claims priority based on Japanese Patent Application No. 2007-180137 filed in Japan on Jul. 9, 2007, the entire contents of which are herein incorporated by reference.

INDUSTRIAL APPLICABILITY

The present invention can be applied to any control device of a lock-up clutch of a vehicle.

The invention claimed is:

1. A control device for a lock-up clutch of a vehicle, the vehicle having a motive power source, an automatic transmission, a hydraulic power transmission device disposed between the motive power source and the automatic transmission, and a lock-up clutch directly connecting an input side and an output side of the hydraulic power transmission device, the control device comprising:
    a deceleration lock-up control performing engagement control of the lock-up clutch during vehicle deceleration;
    a lock-up smooth off control gradually disengaging the lock-up clutch upon completion of the deceleration lock-up control;
    a lock-up smooth off initial pressure learning control learning a disengagement initial pressure of the lock-up smooth off control; and
    a deceleration lock-up differential pressure learning control reflecting a learning value of a disengagement initial pressure of the lock-up smooth off control in a deceleration lock-up differential pressure during the deceleration lock-up control are executed, and in a case wherein the deceleration lock-up differential pressure learning control is entered, the disengagement initial pressure of the lock-up smooth off control is corrected.

2. The control device for a lock-up clutch of claim 1, wherein the disengagement initial pressure of the lock-up smooth off control is corrected to a low side in accordance with a difference between a deceleration lock-up differential pressure instruction value and the disengagement initial pressure of the lock-up smooth off control.

3. A control device for a lock-up clutch of a vehicle, the vehicle having a motive power source, an automatic transmission, a hydraulic power transmission device disposed between the motive power source and the automatic transmission, and a lock-up clutch directly connecting an input side and an output side of the hydraulic power transmission device are mounted, the control device comprising:
    a deceleration lock-up control performing engagement control of the lock-up clutch during vehicle deceleration,
    a lock-up smooth off control gradually disengaging the lock-up clutch at a sweep gradient upon completion of the deceleration lock-up control,
    a lock-up smooth off initial pressure learning control learning a disengagement initial pressure of the lock-up smooth off control, and
    a deceleration lock-up differential pressure learning control reflecting a learning value of a disengagement initial pressure of the lock-up smooth off control in a deceleration lock-up differential pressure during the deceleration lock-up control are executed, and in a case wherein the deceleration lock-up differential pressure learning control is entered, the sweep gradient of the lock-up smooth off control is changed.

4. The control device for a lock-up clutch of claim 3, wherein the sweep gradient of the lock-up smooth off control is corrected to a small side and the disengagement initial pressure of the lock-up smooth off control is corrected to a low side in accordance with a difference between a deceleration lock-up differential pressure instruction value and the disengagement initial pressure of the lock-up smooth off control.

5. A control device for a lock-up clutch of a vehicle, the vehicle having a motive power source, an automatic transmission, a hydraulic power transmission device disposed between the motive power source and the automatic transmission, and a lock-up clutch directly connecting an input side and an output side of the hydraulic power transmission device are mounted, the control device comprising:
    a deceleration lock-up control performing engagement control of the lock-up clutch during vehicle deceleration,
    a lock-up smooth off control gradually disengaging the lock-up clutch at a sweep gradient upon completion of the deceleration lock-up control,
    a lock-up smooth off initial pressure learning control learning a disengagement initial pressure of the lock-up smooth off control, and
    a deceleration lock-up differential pressure learning control reflecting a learning value of a disengagement initial pressure of the lock-up smooth off control in a deceleration lock-up differential pressure during the deceleration lock-up control are executed, and
    a first correction unit configured to correct the disengagement initial pressure of the lock-up smooth off control upon entry into the deceleration lock-up differential pressure learning control and
    a second correction unit configured to change the sweep gradient of the lock-up smooth off control upon entry into the deceleration lock-up differential pressure learning control are provided.

6. The control device for a lock-up clutch of claim 5, wherein the first correction unit is configured to correct the disengagement initial pressure of the lock-up smooth off control to a low side in accordance with a difference between a deceleration lock-up differential pressure instruction value and the disengagement initial pressure of the lock-up smooth off control and the second correction unit is configured to correct the sweep gradient of the lock-up smooth off control to a small side and corrects the disengagement initial pressure of the lock-up smooth off control to a low side, in accordance with the difference between the deceleration lock-up differential pressure instruction value and the disengagement initial pressure of the lock-up smooth off control.

* * * * *